United States Patent
Galera et al.

(10) Patent No.: US 9,477,907 B2
(45) Date of Patent: Oct. 25, 2016

(54) INTEGRATION OF OPTICAL AREA MONITORING WITH INDUSTRIAL MACHINE CONTROL

(71) Applicant: Rockwell Automation Technologies, Inc., Mayfield Heights, OH (US)

(72) Inventors: Richard Galera, Nashua, NH (US);
Anne Bowlby, Lowell, MA (US);
Derek W. Jones, Galloway (GB);
Nilesh Pradhan, South Grafton, MA (US); Francis L. Leard, Sudbury, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/943,246

(22) Filed: Nov. 17, 2015

(65) Prior Publication Data

US 2016/0070991 A1 Mar. 10, 2016

Related U.S. Application Data

(63) Continuation of application No. 14/553,431, filed on Nov. 25, 2014, now Pat. No. 9,256,944.

(60) Provisional application No. 62/000,487, filed on May 19, 2014.

(51) Int. Cl.
*G06K 9/00* (2006.01)
*G06K 9/62* (2006.01)
(Continued)

(52) U.S. Cl.
CPC ............ *G06K 9/6267* (2013.01); *F16P 3/142* (2013.01); *G05B 19/048* (2013.01);
(Continued)

(58) Field of Classification Search
USPC ................................. 382/141–152
See application file for complete search history.

(56) References Cited

U.S. PATENT DOCUMENTS 4,967,317 A 10/1990 Plumly
6,235,148 B1 5/2001 Courson et al.
(Continued)

FOREIGN PATENT DOCUMENTS

DE 102006048166 2/2008
DE 102012021375 5/2013
(Continued)

OTHER PUBLICATIONS

Extended European Search Report for EP Application Serial No. 15168237.4, dated Nov. 12, 2015, 8 pages.
(Continued)

*Primary Examiner* — Alex Liew
(74) *Attorney, Agent, or Firm* — Amin, Turocy & Watson, LLP

(57) ABSTRACT

An industrial safety system is provided that integrates optical safety monitoring with machine control. The safety system includes an imaging sensor device supporting pixel array processing functions that allow time-of-flight (TOF) analysis to be performed on selected portions of the pixel array, while two-dimensional imaging analysis is performed on the remaining portions of the array, reducing processing load and response time relative to performing TOF analysis for all pixels of the array. The portion of the pixel array designated for TOF analysis can be pre-defined through configuration of the imaging sensor device, or can be dynamically selected based on object detection and classification by the two-dimensional imaging analysis. The imaging sensor device can also implement a number of safety and redundancy functions to achieve a high degree of safety integrity.

20 Claims, 19 Drawing Sheets

(51) Int. Cl.
| | | |
|---|---|---|
| *G06T 7/00* | (2006.01) | |
| *F16P 3/14* | (2006.01) | |
| *G05B 19/048* | (2006.01) | |
| *G06K 9/52* | (2006.01) | |
| *G06T 7/20* | (2006.01) | |
| *G06T 7/60* | (2006.01) | |
| *H04N 7/18* | (2006.01) | |

(52) U.S. Cl.
CPC ..... *G06K 9/00201* (2013.01); *G06K 9/00362* (2013.01); *G06K 9/00369* (2013.01); *G06K 9/00771* (2013.01); *G06K 9/52* (2013.01); *G06K 9/6288* (2013.01); *G06T 7/0026* (2013.01); *G06T 7/0044* (2013.01); *G06T 7/2033* (2013.01); *G06T 7/60* (2013.01); *H04N 7/18* (2013.01); *G05B 2219/14006* (2013.01); *G06T 2200/04* (2013.01); *G06T 2207/10028* (2013.01); *G06T 2207/30108* (2013.01); *G06T 2207/30164* (2013.01); *G06T 2207/30196* (2013.01); *G06T 2207/30232* (2013.01); *G06T 2207/30241* (2013.01)

(56) References Cited

U.S. PATENT DOCUMENTS

| | | | |
|---|---|---|---|
| 7,255,691 | B2 | 8/2007 | Tolkoff et al. |
| 7,796,820 | B2 | 9/2010 | Simon et al. |
| 8,224,032 | B2 | 7/2012 | Fuchs et al. |
| 8,253,792 | B2* | 8/2012 | Wells ............... H04N 7/181 348/152 |
| 8,421,037 | B2 | 4/2013 | Leard |
| 8,480,246 | B2 | 7/2013 | Leard |
| 8,531,308 | B2 | 9/2013 | Dickie et al. |
| 9,251,598 | B2* | 2/2016 | Wells ............... G06T 7/2093 |
| 2002/0061134 | A1* | 5/2002 | Cofer ............... F16P 3/14 382/181 |
| 2002/0186299 | A1* | 12/2002 | Cofer ............... F16P 3/142 348/152 |
| 2004/0041984 | A1 | 3/2004 | Tani et al. |
| 2004/0150991 | A1 | 8/2004 | Ouderkirk et al. |
| 2004/0150997 | A1 | 8/2004 | Ouderkirk et al. |
| 2004/0233416 | A1 | 11/2004 | Doemens et al. |
| 2005/0207618 | A1* | 9/2005 | Wohler ............... B25J 9/1674 382/103 |
| 2006/0227317 | A1 | 10/2006 | Henderson et al. |
| 2007/0217670 | A1* | 9/2007 | Bar-Am ............... B61K 9/08 382/141 |
| 2008/0013821 | A1 | 1/2008 | Macgregor et al. |
| 2008/0144000 | A1 | 6/2008 | Thun et al. |
| 2008/0302951 | A1 | 12/2008 | Aoki et al. |
| 2009/0079841 | A1 | 3/2009 | Leard et al. |
| 2009/0129115 | A1 | 5/2009 | Fine et al. |
| 2009/0257241 | A1 | 10/2009 | Meinke et al. |
| 2010/0128109 | A1 | 5/2010 | Banks |
| 2010/0136302 | A1 | 6/2010 | Comanzo et al. |
| 2011/0050878 | A1 | 3/2011 | Wells et al. |
| 2011/0051119 | A1 | 3/2011 | Min et al. |
| 2012/0106791 | A1 | 5/2012 | Lim |
| 2012/0146789 | A1* | 6/2012 | De Luca ............... G08B 21/12 340/540 |
| 2012/0146792 | A1* | 6/2012 | De Luca ............... G08B 21/245 340/568.1 |
| 2012/0293625 | A1 | 11/2012 | Schneider et al. |
| 2012/0330447 | A1 | 12/2012 | Gerlach et al. |
| 2013/0038882 | A1 | 2/2013 | Umeda et al. |
| 2013/0044310 | A1 | 2/2013 | Mimeault |
| 2013/0155723 | A1 | 6/2013 | Coleman |
| 2013/0194776 | A1 | 8/2013 | Santos et al. |
| 2013/0300835 | A1 | 11/2013 | Kinoshita et al. |
| 2014/0294245 | A1* | 10/2014 | Siilats ............... A61B 3/113 382/107 |
| 2015/0043787 | A1 | 2/2015 | Fredrich et al. |

FOREIGN PATENT DOCUMENTS

| | | |
|---|---|---|
| EP | 0835460 | 4/1998 |
| GB | 2319426 | 5/1998 |
| KR | 20130008469 | 1/2013 |
| WO | 2008152647 | 12/2008 |
| WO | 2013135608 | 9/2013 |

OTHER PUBLICATIONS

Office Action dated Dec. 17, 2015 for U.S. Appl. No. 14/509,466, 25 pages.
Extended European Search Report for EP Application Serial No. 15168241.6, dated Mar. 7, 2016, 8 pages.
Extended European Search Report for EP Application Serial No. 15168237.4, dated Dec. 21, 2015, 2 pages.
Extended European Search Report for EP Application Serial No. 15168239.0, dated Nov. 30, 2015, 2 pages.
Extended European Search Report for EP Application Serial No. 15168119.4, dated Nov. 30, 2015, 2 pages.
Final Office Action for U.S. Appl. No. 14/509,466 dated Apr. 8, 2016, 20 pages.
Notice of Allowance for U.S. Appl. No. 14/553,431, dated Oct. 8, 2015, 25 pages.
Extended European Search Report for EP Application Serial No. 15168239.0, dated Oct. 5, 2015, 10 pages.
Extended European Search Report for EP Application Serial No. 15168119.4, dated Oct. 26, 2015, 9 pages.
Office Action for U.S. Appl. No. 14/509,466, dated Jul. 29, 2016, 21 pages.

* cited by examiner

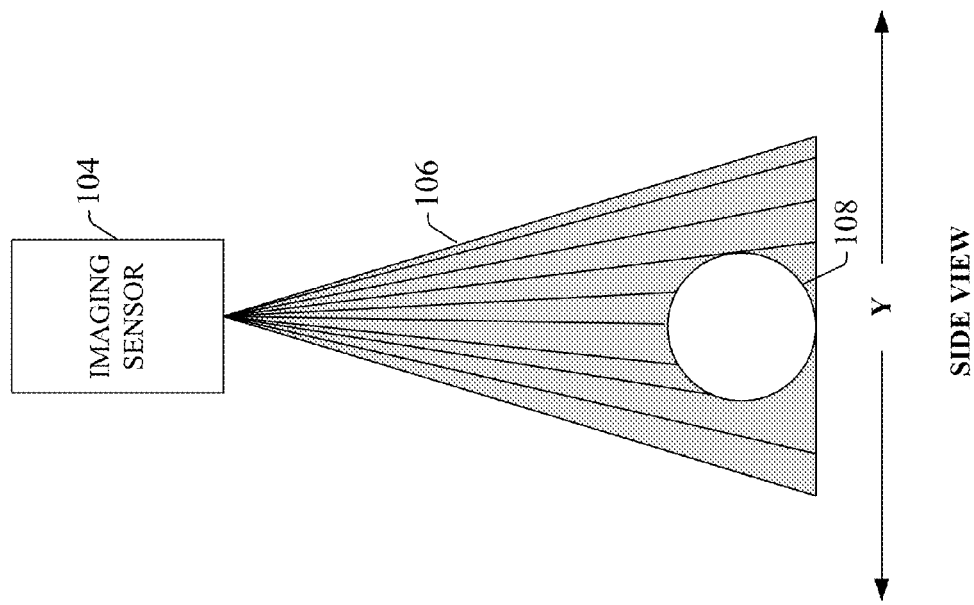
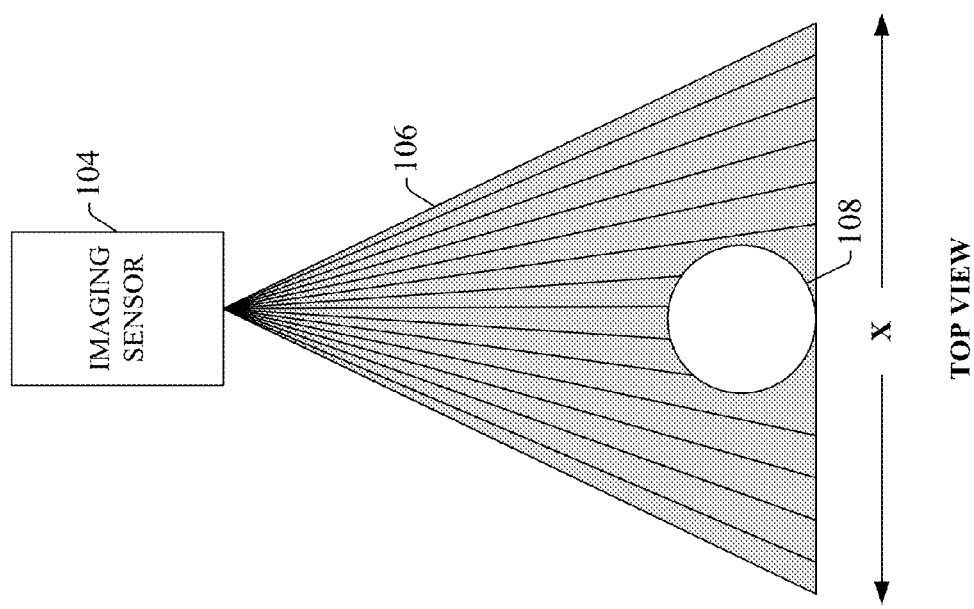
FIG. 1

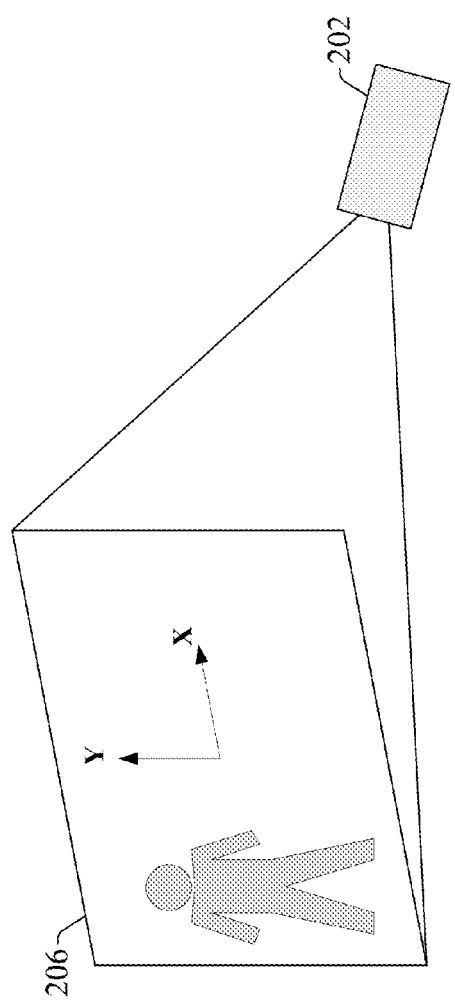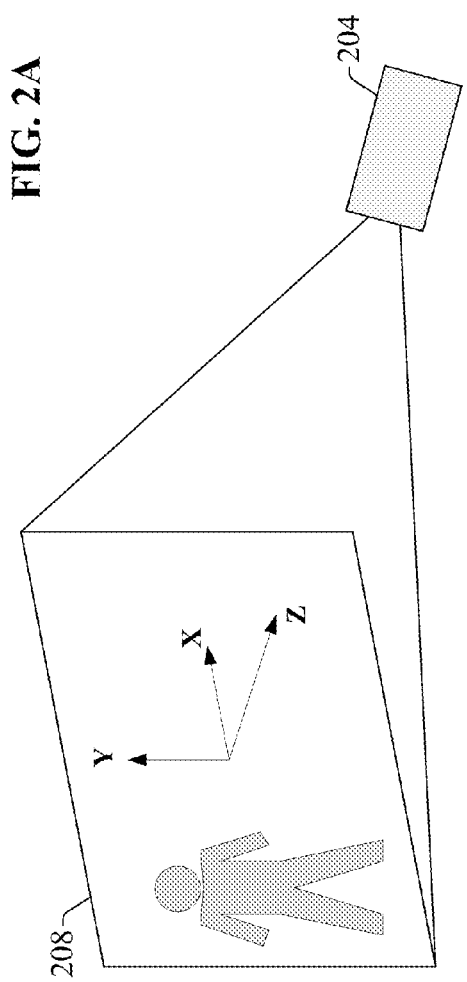

INTEGRATION OF OPTICAL AREA MONITORING WITH INDUSTRIAL MACHINE CONTROL

CROSS-REFERENCE TO RELATED APPLICATIONS

This application is a continuation of, and claims priority to, U.S. patent application Ser. No. 14/553,431, filed on Nov. 25, 2014, and entitled "INTEGRATION OF OPTICAL AREA MONITORING WITH INDUSTRIAL MACHINE CONTROL," which claims priority to U.S. Provisional Application Ser. No. 62/000,487, filed on May 19, 2014, entitled "INTEGRATION OF OPTICAL AREA MONITORING WITH INDUSTRIAL MACHINE CONTROL." The entireties of these related applications are incorporated herein by reference.

BACKGROUND

The subject matter disclosed herein relates generally to industrial safety, and, more particularly, to integration of industrial control with optical area monitoring using an imaging sensor capable of performing selective time-of-flight (TOF) analysis on specified portions of a pixel array

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, an optical safety system is provided comprising a pixel array component configured to, for one or more pixel arrays of one or more images of a hazardous industrial area captured by one or more imaging sensor devices, group pixels of the one or more pixel arrays to yield a subset of the pixels on which two-dimensional (2D) analysis is to be performed; an image analysis component configured to perform 2D analysis on the subset of the pixels; a distance determination component configured to perform 3D analysis on point cloud data received from the one or more imaging sensor devices; and a hazard analysis and decision component configured to classify a first object in the image as motorized industrial equipment and a second object in the images as a human based on results of the 2D analysis and the 3D analysis, to correlate the results of the 2D analysis and the 3D analysis to yield correlated information relating to a relationship between the human and the motorized industrial equipment, and to generate a control output that controls the motorized equipment based on the correlated information.

Also, one or more embodiments provide a method for controlling motorized industrial equipment, comprising collecting, by a safety system comprising at least one processor, image data from one or more imaging sensor devices that monitor a hazardous industrial zone; performing two-dimensional (2D) imaging analysis on a set of pixels of the image data; performing three-dimensional (3D) analysis on point cloud data comprising distance information for selected pixels of the image data calculated by the one or more imaging sensor devices; classifying a first object in the image data as a human based on at least one of the 2D imaging analysis or the 3D analysis; classifying a second object in the images data as motorized industrial equipment based on at least one of the 2D imaging analysis or the 3D analysis; correlating results of the 2D imaging analysis and the 3D analysis to yield correlated information relating to a relationship between the human and the motorized equipment within the hazardous industrial zone; and sending an instruction to alter operation of the motorized industrial equipment based on the correlated information.

Also, according to one or more embodiments, a non-transitory computer-readable medium is provided having stored thereon instructions that, in response to execution, cause a system comprising a processor to perform operations, the operations, comprising collecting image data from one or more imaging sensor devices monitoring a hazardous industrial area; performing two-dimensional (2D) imaging analysis on one or more groups of pixels comprising the image data; performing 3D (3D) analysis on point cloud data comprising distance information generated for selected pixels of the image data received from the one or more imaging sensor devices; classifying a first object in the image data as a human based on at least one of the 2D imaging analysis or the 3D analysis; classifying a second object in the image data as motorized industrial equipment based on at least one of the 2D imaging analysis or the 3D analysis; correlating results of the 2D imaging analysis and the 3D analysis to yield correlated information relating to a relationship between the human and the motorized equipment within the hazardous industrial zone; sending an instruction to alter operation of the motorized industrial equipment based on the correlated information.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 1 is a schematic illustrating 2D detection of an object in the X and Y dimensions using a two-dimensional imaging sensor.

FIG. 2A is a schematic illustrating 2D image analysis of an image using a 2D image sensor.

FIG. 2B is a schematic illustrating 3D image analysis of an image using a 3D image sensor.

DETAILED DESCRIPTION

Figure 3:
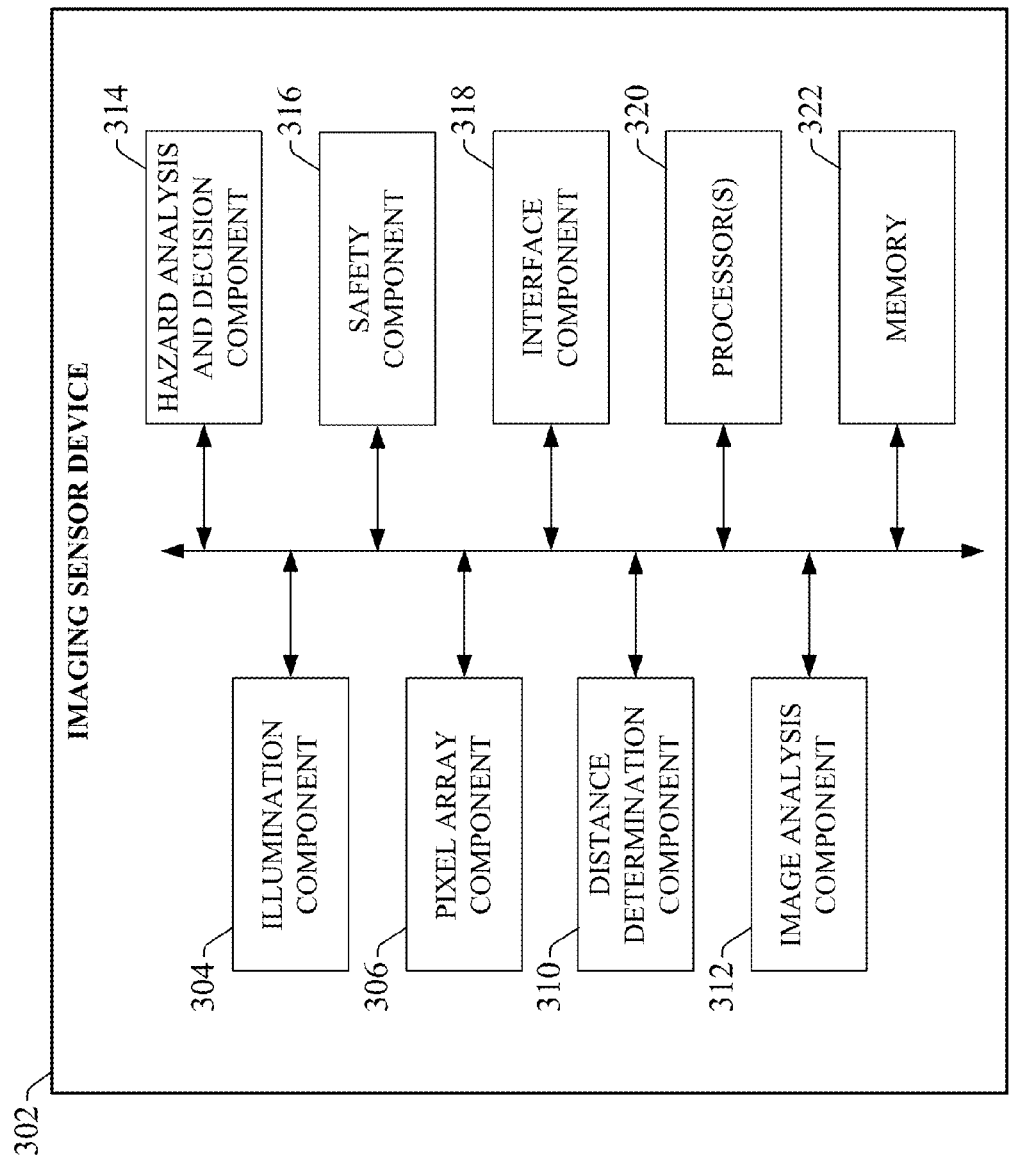
FIG. 3 is a block diagram of an example imaging sensor device.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Two-dimensional (2D) imaging sensors are generally used to detect and identify shape and/or surface characteristics of objects within a viewing field of the sensor. FIG. 1 illustrates identification of an object using a 2D imaging sensor 104. Some types of 2D imaging sensors (e.g., imaging cameras) operate by projecting a wide, light beam 106 toward an area to be monitored and collecting the reflected light reflected from the surfaces and objects (e.g., object 108) within the viewing area at a receiver. Some sensors may sweep the light beam 106 across the viewing area in an oscillatory manner to collect line-wise image data, which is analyzed to identify object edges and surfaces, surface patterns, or other such information. Alternatively, the sensor 104 may project a stationary, substantially planar beam of light across an area of interest and collect data on objects that pass through the beam. In general, 2D image sensors perform grayscale or red-green-blue (RGB) analysis on the pixel data generated based on the reflected light to yield two-dimensional image data for the viewing field, which can be analyzed to identify object edges, object surface patterns or contours, or other such information. FIG. 2A is a schematic illustrating 2D image analysis of an image 206 using a 2D image sensor 202. 2D image analysis yields object and surface information in the x-y plane. Depending on the particular application in which the imaging sensor is being used, the sensor will generate suitable outputs based on the objects and/or patterns detected within the viewing area.

Three-dimensional (3D) image sensors, also known as time-of-flight (TOF) sensors, are designed to generate distance information as well as two-dimensional shape information for objects and surfaces within the sensor's viewing field. Some types of TOF sensors determine a distance of an object using phase shift monitoring techniques, whereby a beam of light is emitted to the viewing field, and the measured phase shift of light reflected from the object relative to the emitted light is translated to a distance value. Other types of TOF sensors that employ pulsed light illumination measure the elapsed time between emission of a light pulse to the viewing field and receipt of a reflected light pulse at the sensor's photo-receiver. Since this time-of-flight information is a function of the distance of the object or surface from the sensor, the sensor is able to leverage the TOF information to determine the distance of the object or surface point from the sensor. FIG. 2B a schematic illustrating 3D image analysis of an image 208 using a 3D image sensor 204. As shown in this figure, 3D analysis yields distance or depth information in the z-direction (that is, the distance of objects and surfaces from the sensor 204) as well as imaging information in the x-y plane.

Three-dimensional image analysis—which entails measurement of time-of-flight information and subsequent calculation of distance information—is generally more processing intensive than 2D image analysis. The additional processing time and power required for 3D analysis may render 3D image sensors unsuitable for certain types of applications that require fast, reliable response times. However, there are certain types of applications that could benefit from 3D image analysis, but which require fast and reliable decision-making and response times. For example, industrial safety monitoring applications must be able to reliably detect the presence of human beings within a potentially hazardous area, and to respond with appropriate safety control outputs (e.g., commands to stop or slow a running machine, to remove power from hazardous machinery, etc.) with minimal delay to prevent injury.

To address these and other issues, one or more embodiments of the present disclosure provide an industrial safety monitoring system that include an imaging sensor capable of performing 3D image analysis on selected subsets or portions of the sensor's pixel array. In one or more embodiments, the imaging sensor allows one or more specified portions of the pixel array to be selected for 3D (time-of-flight) analysis in order to obtain distance information for pixels in that portion of the pixel array, while the remaining pixel array areas will be processed using 2D image analysis. For example, after the imaging sensor is trained on the area of interest, a user may select a horizontal stripe of pixels across a middle section (or an upper or lower edge) of the pixel array for 3D analysis, so that distance information as well as object identification information can be obtained and managed for the area corresponding to the selected stripe of pixels. The imaging sensor will apply 2D analysis (e.g., grayscale or RGB analysis) to the remaining, non-selected areas of the pixel array in order to detect, identify, classify, and/or correlate objects within the viewing area. Since 2D imaging processes more quickly than 3D processing, processing load is reduced and sensor response time is improved by limiting 3D analysis to only those areas of the scene for which distance information is required. The imaging sensor can also be configured to correlate results of the 2D and 3D analysis so that the identity, speed, distance, and trajectory of an object within the viewing space can be obtained with a high level of safety integrity. The imaging sensor is configured to interface with one or more pieces of industrial equipment (e.g. an industrial automation controller, a motion device, a robot or other hazardous machine, etc.), and can send control instructions to the industrial equipment over a networked or hardwired interface based on results of the 2D and 3D image processing. In this way, control of an industrial system is supplemented by the imaging sensor, which provides a layer of vision facilitating additional control of the industrial system based on objects, movements, and events within the monitored area or volume.

In some embodiments, the imaging sensor may be configured to dynamically select or modify the portion of the pixel array to which 3D analysis is to be applied; e.g., based on detection of an object within the viewing area that satisfies one or more criteria. For example, during normal operation, the imaging sensor may be configured to perform continuous 2D analysis on the entire pixel array until an object or collection of objects having a certain defined classification (e.g., a person, a trolley, etc.) is detected. When such an object is detected—e.g., when a person enters the viewing area of the sensor—the sensor may define a portion of the pixel array corresponding to an area around the object for 3D analysis, so that TOF (distance) information for the object can be tracked. The imaging sensor may dynamically change this defined pixel area to move with object so that distance and speed information can be monitored for the object as long as the object remains within the viewing area.

In one or more embodiments, the imaging sensor may also be configured to, for a given image, identify non-contiguous groups of pixels that belong to a single object of a defined classification. This can allow the imaging sensor to identify the presence of a person within the viewing area even if the person is partially obscured within the image. For example, the imaging sensor may be trained to identify the presence of two separate visible objects corresponding to human legs, and to correlate these two objects within the image as belonging to a human being who is within the viewing area but partially obscured. The sensor can track these correlated objects as necessary (e.g., by performing 3D analysis on the pixel areas corresponding to the two objects) so that appropriate safety output can be delivered to a controlled industrial system based on the location and speed of the person within the area.

FIG. 3 is a block diagram of an example imaging sensor device 302 according to one or more embodiments of this disclosure. Although FIG. 3 depicts certain functional components as residing on imaging sensor device 302, it is to be appreciated that one or more of the functional components illustrated in FIG. 3 may reside on a separate device relative to imaging sensor device 302 in some embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Imaging sensor device 302 can include an illumination component 304, a pixel array component 306, a distance determination component 310, an image analysis component 312, a hazard analysis and decision component 314, a safety component 316, an interface component 318, one or more processors 320, and memory 322. In various embodiments, one or more of the illumination component 304, pixel array component 306, distance determination component 310, image analysis component 312, hazard analysis and decision component 314, safety component 316, interface component, the one or more processors 320, and memory 322 can be electrically and/or communicatively coupled to one another to perform one or more of the functions of the imaging sensor device 302. In some embodiments, components 304, 306, 310, 312, 314, 316, and 318 can comprise software instructions stored on memory 322 and executed by processor(s) 320. Imaging sensor device 302 may also interact with other hardware and/or software components not depicted in FIG. 2. For example, processor(s) 318 may interact with one or more external user interface devices, such as a keyboard, a mouse, a display monitor, a touch-screen, or other such interface devices. Imaging sensor device 302 may also include network communication components and associated networking ports for sending data generated by any of components 304, 306, 310, 312, 314, 316, and 318 over a network (either or both of a standard data network or a safety network), or over a backplane.

Illumination component 304 can be configured to control emission of light by the sensor device. Imaging sensor device 302 may comprise a laser or light emitting diode (LED) light source under the control of illumination component 304. In some embodiments, illumination component 304 may generate pulsed light emissions directed to the viewing field, so that time-of-flight information for the reflected light pulses can be generated by the sensor device. The pixel array component 306 can be configured to process and analyze a pixel array corresponding to an image of the viewing field monitored by the sensor device. For example, the pixel array component 306 may control which subset of pixels will be processed using 3D analysis. The subset of pixels to which 3D analysis is to be applied may be fixed (e.g., preconfigured via user input); alternatively, the pixel array component 306 may select the subset of pixels for 3D analysis dynamically according to one or more defined criteria (e.g., human or facial recognition, object classification, etc.).

Distance determination component 310 can be configured to derive distance information by performing 3D analysis on all or selected portions of the pixel array data. Any suitable analysis technique can be implemented by distance determination component, including but not limited to phase shift monitoring or pulsed time of flight analysis.

The image analysis component 312 can be configured to perform 2D analysis on portions of the pixel array that have not been selected for 3D analysis. The hazard analysis and decision component 314 can be configured to analyze and control one or more sensor outputs based on results generated by the pixel array component 306, distance determination component 310, image analysis component 312, and the safety component 316. This can include, for example, sending a control signal to a control or supervisory device (e.g., an industrial controller, an on-board computer mounted in a mobile vehicle, etc.) to perform a control action, initiating a safety action (e.g., removing power from a hazardous machine, switching an industrial system to a safe operating mode, etc.), sending a feedback message to one or more plant personnel via a human-machine interface (HMI) or a personal mobile device, sending data over a safety network, or other such output.

Safety component 316 can be configured to implement one or more safety and/or redundancy features within the imaging sensor device 302 to render the sensor device suitable for use in safety applications (e.g., industrial safety applications designed to monitor a hazardous area and reliably perform automated control actions to mitigate risk of injury in response to detection of a potentially unsafe human presence or action, automobile safety applications in which one or more imaging sensors mounted on a vehicle control breaking of the vehicle based on detected risk conditions, etc.). By implementing such safety and redundancy functions, the imaging sensor device 302 can monitor a two-dimensional plane and a three-dimensional volume and respond to detected conditions with a high safety integrity level (e.g., SIL or ASIL), making the sensor device suitable for use in some safety application as an alternative to light curtains or other such sensors. Interface component 318 can be configured to exchange data between imaging sensor device 302 and one or more other pieces of industrial equipment (e.g., an industrial controller, a safety controller, a robot controller, an industrial machine etc.). For example, interface component 318 may be configured to interface with a plant network (e.g., a control and information protocol network, and Ethernet/IP network, a safety network, etc.) and exchange data with other devices over the network connection.

The one or more processors 320 can perform one or more of the functions described herein with reference to the systems and/or methods disclosed. Memory 322 can be a computer-readable storage medium storing computer-executable instructions and/or information for performing the functions described herein with reference to the systems and/or methods disclosed.

Although components 304-318 are depicted in FIG. 3 as integrated components of an imaging sensor device 302, it is to be appreciated that, in some implementations, some of the components 304-318 may reside on a separate hardware component of a larger safety system of which imaging sensor device 302 is a part. For example, imaging sensor device 302 may be one of multiple imaging devices that monitor a hazardous zone from various angles and provide imaging data to a central safety controller for analysis, decision-making, and control. In such implementations, one or more of the components 304-318 may reside on the safety controller while other components may reside on one or more imaging sensor devices.

Figure 4A:
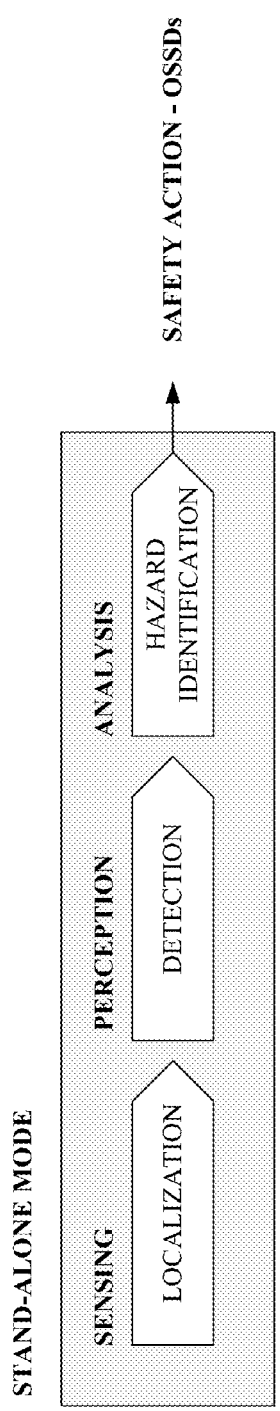
FIG. 4A is a generalized functional model for industrial safety systems.

FIG. 4A illustrates a generalized functional model often implemented by conventional industrial safety systems. As illustrated in 4A, conventional safety systems often implement sensing, perception, and analysis functions to determine when to issue suitable safety outputs (e.g., output signal switching devices, or OSSD, outputs). Based on localization and detection of an object within an industrial environment, a potential hazard is identified and a safety output is used that disables one or more machine functions based on the location of the object relative to the machine.

Figure 4B:
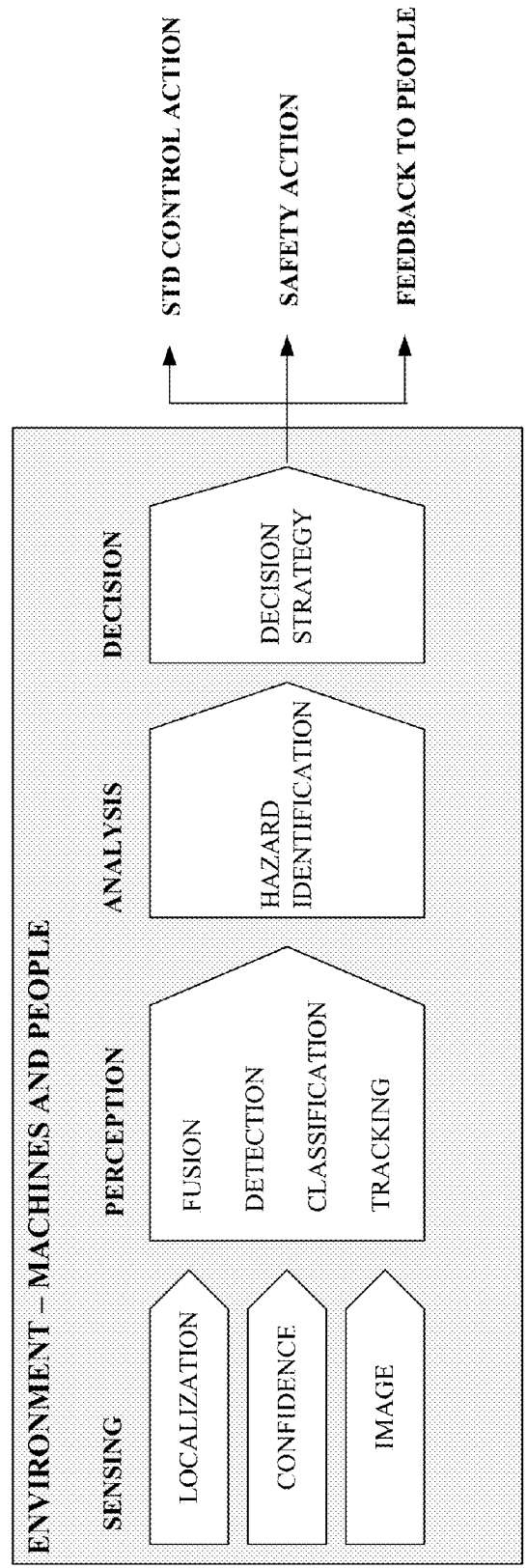
FIG. 4B is a generalized functional model illustrating functionality performed by an industrial safety and control system that utilizes an imaging sensor device.

FIG. 4B is a generalized functional model illustrating functionality performed by an industrial safety and control system that utilizes one or more imaging sensor devices according to one or more embodiments. Functions carried out by the system can be classified into four categories—sensing, perception, analysis, and decision. Sensing generally comprises collecting information about the industrial environment being monitored. This includes information that allows the system to localize people, objects, machines, and other entities within the environment with a minimal degree of confidence. At least some of the data can be obtained from image data collected by one or more imaging sensor devices configured to visually monitor the environment.

Perception allows the system to make sense of the environment given the data collected by the sensing functions. To this end, information from multiple different sensors (e.g., imaging sensors or other types of sensing devices) can be fused and correlated in order to detect objects within the environment with a high degree of confidence. The system can also classify objects based on the sensed data (e.g., distinguish between humans, vehicles, machines, etc.), determine current or anticipated behaviors of the objects, and track detected objects as they move through the viewing space. The system may use multiple sensing technologies—in addition to 2D and 3D sensing—in order to accurately classify objects, including but not limited to passive infrared sensing, localization, object tagging, temperature sensing, etc. The system can then identify hazardous conditions based on analysis of the perceived information. For example, the location of certain objects or humans relative to a machine, together with the machine's current behavior (e.g., running, stopped, high speed, low speed, etc.), may indicate a potential hazard requiring action by the system to mitigate risk of injury or damage. Accordingly, the system can make a decision regarding a suitable response to the condition based on a defined decision strategy. In another example, the behavior of a motorized industrial system (e.g., running, stopped, high speed, low speed, movement direction, etc.) such as a robot can be monitored by feedback from the robot controller and also from the 2D/3D imaging sensor(s). The system can thus diagnose anomalies by cross-monitoring data relating to robot behavior from both sources. A detected anomaly may indicate a potential hazard due to a fault requiring action by the system to mitigate risk of injury or damage. Accordingly, the system can make a decision regarding a suitable response to the condition based on a defined decision strategy. This provides a system-level layer of fault diagnosis in addition to any diagnostics capability embedded in the robot controller and 2D/3D imaging sensor(s) and could thereby serve to increase the safety integrity level (e.g., PL, SIL, or ASIL) of the whole or parts of the system.

Depending on the scenario, the system may generate a standard control action that allows the industrial system to continue running, but in an altered state that mitigates the risks associated with the identified hazard. If the hazard has an associated risk of injury to a human operator, the system may decide to initiate a safety action to stop the machine. In addition to controlling the machine's behavior based on analysis of the environment, the system may also attempt to control human behavior in an effort to further mitigate risk by issuing feedback or instructions to people in the environment.

Figure 4C:
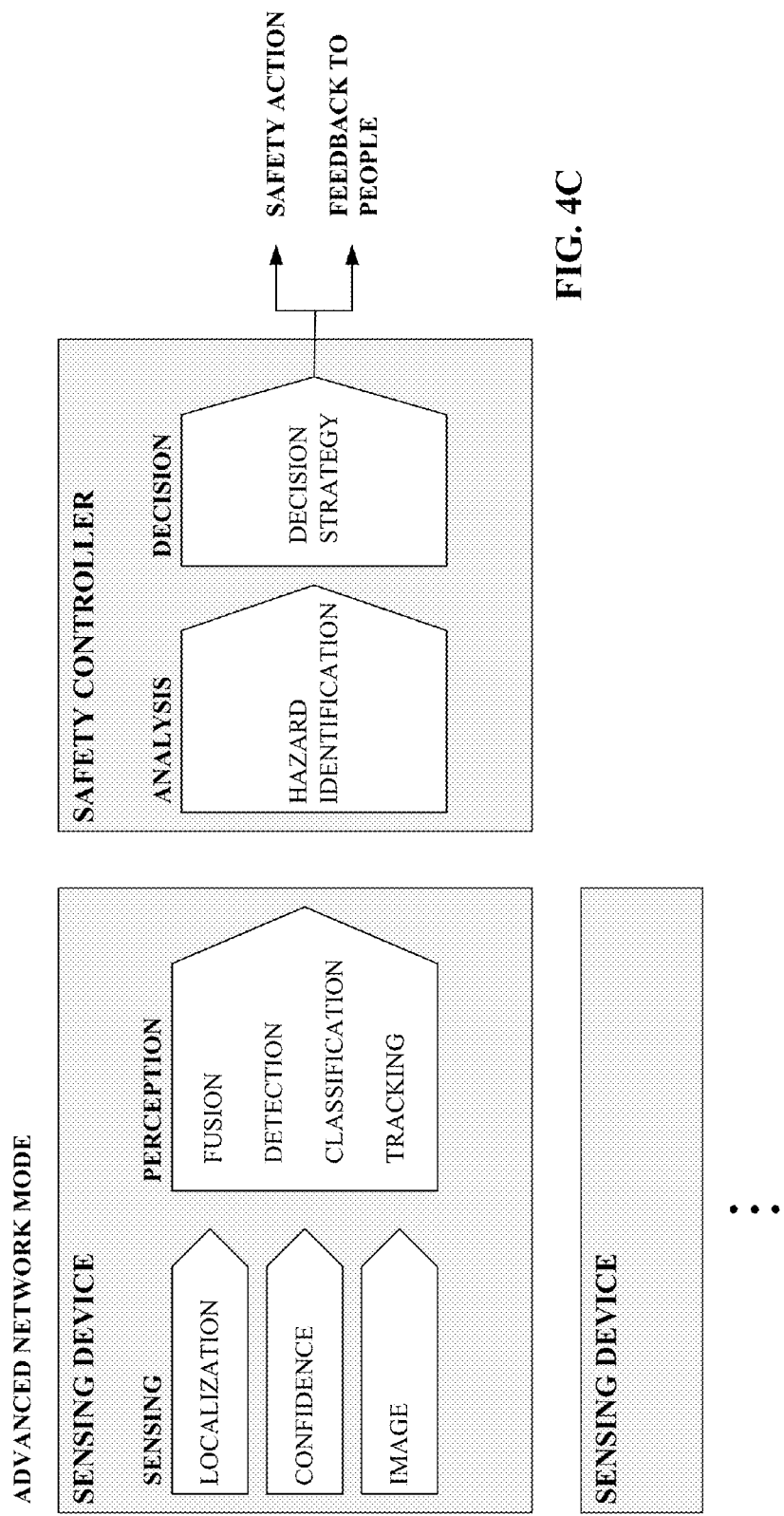
FIG. 4C is a generalized functional model illustrating an example implementation of optical safety monitoring and machine control integration.

FIG. 4C is a generalized functional model illustrating an example implementation of the functions depicted in FIG. 4B. In this example, sensing and perception functions are performed on an imaging sensor device (e.g., imaging sensor device 302), while analysis and decision is performed on a safety programmable logic controller (PLC) or other type of safety controller. This configuration allows a central safety controller to receive information from one or more imaging sensor devices regarding the presence, location, classification, and behavior of objects within the environment, and perform hazard identification analysis and decision-making locally based on the gathered sensor information. This allows a configuration whereby multiple redundant imaging sensors can monitor a hazardous environment from multiple angles, and provide information about the environment to the safety controller, which can then make decisions regarding a suitable safety response. In some embodiments, some or all of the perception functionality can be performed in the safety controller rather than (or in addition to) the imaging sensor devices. For example, each of the multiple imaging sensor devices can generate 3D point cloud data (pixel-level distance information) for their respective views of the hazardous area, and provide the point cloud data to the safety controller, which then aggregates the point cloud data collected from all the imaging sensor devices to generate multi-angle three-dimensional image data for the scene. The safety controller can then detect, classify and track objects within the hazardous area based on analysis of this three-dimensional image data. In another example implementation, one or more of the perception, analysis, or decision functions can be implemented directly on an industrial controller, which may receive data from the one or more imaging sensor devices via a network connection.

It is to be appreciated that the implementations described above are only intended to be exemplary, and that other configurations are within the scope of one or more embodiments of this disclosure. For example, in some implementations the analysis and decision functions can be performed on the one or more of the imaging sensor devices themselves, which then provide instructions to other industrial components (e.g., industrial controllers or other devices) based on the decision strategy implemented by the sensor. In another example implementation, the central safety controller can receive information from one or more imaging sensors using additional diverse technologies (e.g., separate CMOS grey scale imaging, radar, ultra-sonic, etc.) regarding the presence, location, classification, and behavior of objects within the environment, and perform hazard identification analysis and decision-making locally based on the gathered sensor information.

Figure 5:
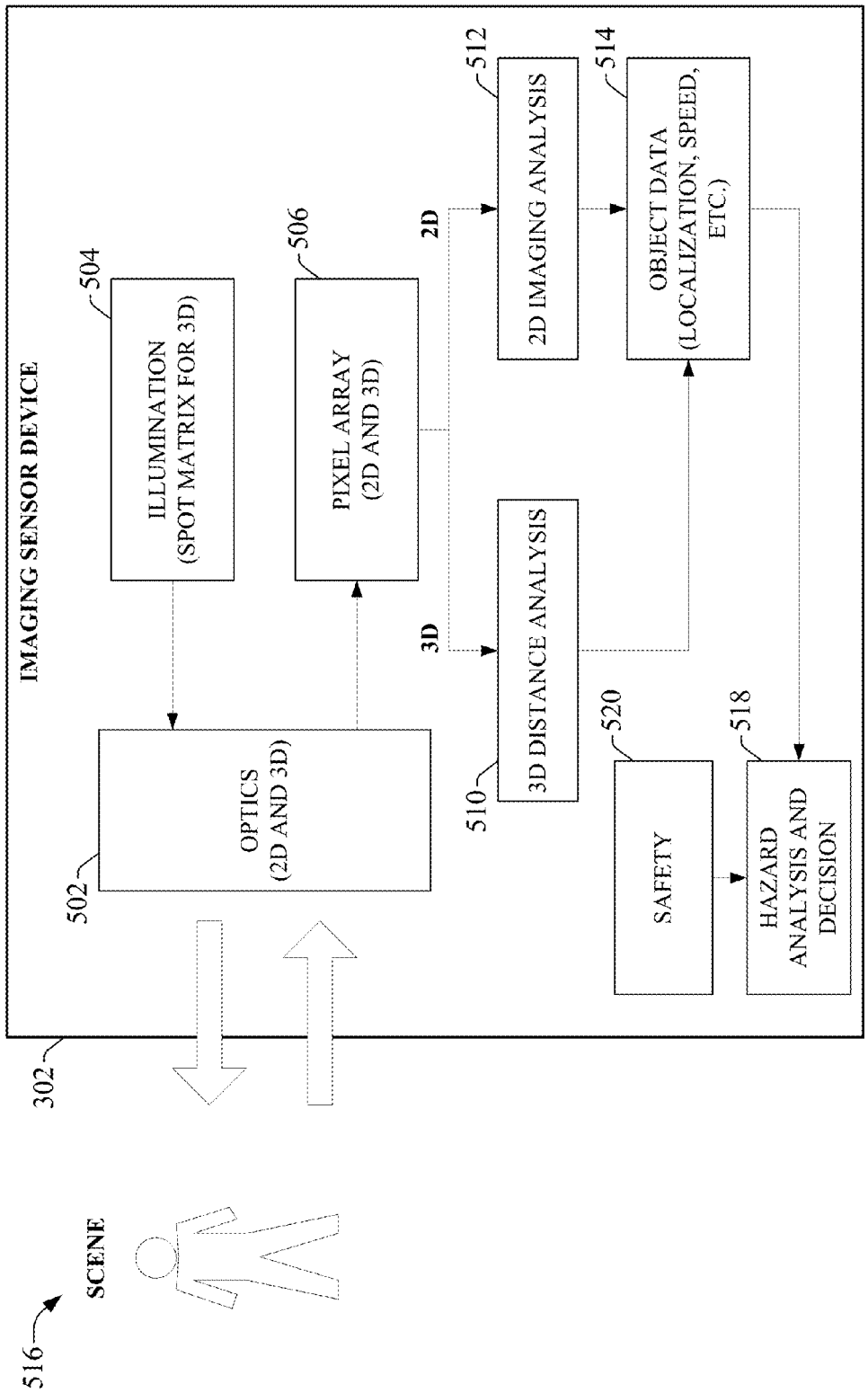
FIG. 5 is a functional block diagram illustrating an overview of an imaging sensor device's operations.

FIG. 5 is a functional block diagram illustrating an overview of the imaging sensor device's operations. Optics block 502 includes the light emitter (e.g., a laser, LED, or remote phosphor emitter) for projecting a light beam to the monitored scene 516 and an array of photo-receivers for receiving reflected light pulses from objects and surfaces within the scene. Illumination block 504 controls the projection of light by the LED, laser, or remote phosphor laser light source. In some embodiments, the illumination block 504 may project a beam of light or light pulses to achieve a uniform illumination across the scene 516. Alternatively, the illumination block may implement patterned illumination for 3D analysis, whereby light is concentrated in spots that are spaced across the scene 516 to ensure detection of objects of a given minimum size. This illumination technique can ensure accurate object detection at increased distances without increasing the power of the light source. Alternatively, the illumination block 504 may project light to achieve a uniform illumination across the scene 516.

Upon receipt of reflected light at the photo-receivers of the imaging sensor device 302, pixel data is generated based on the light intensity measured at each photo-receiver, and pixel array block 506 performs processing on the resulting pixel array data comprising the image. This can include, for example, identifying a first subset of pixels in the array on which 3D processing is to be performed, and designating a remaining second subset of pixels for 2D imaging analysis. Subsequent processing of each pixel depends upon the type of analysis (2D or 3D) to be performed on that pixel.

For a pixel selected for 3D (distance or depth) analysis, 3D distance analysis 510 determines a distance of an object or surface in the viewing field corresponding to the pixel, e.g., using phase shift time-of-flight analysis on a light beam reflected by the object, or using pulsed time-of-flight analysis on a light pulse reflected from the object. Performing distance calculations for each pixel of the 3D analysis portion(s) of the pixel array yields a 3D point cloud for the selected areas of the viewing field.

2D imaging block 512 performs 2D image analysis on the portion(s) of the pixel array for which 3D analysis is not performed. 2D image analysis can comprise RGB or grayscale analysis of the image portions corresponding to the non-3D pixels, including but not limited to edge detection, contour analysis, image sharpening, contrast adjustment, difference and additive imaging, etc. The imaging sensor device 302 can employ 2D image analysis to identify objects within the viewing area and determine whether the identified objects correspond to one or more defined object classifications (e.g., a human being, a forklift or trolley, a machined part on a conveyor, a pallet containing packaged products, etc.). In some embodiments, the imaging sensor device 302 may also be configured to perform facial recognition using 2D image analysis, which is useful for applications in which a control decision or operator feedback output is dependent upon an identity of the person detected within the viewing field.

Imaging sensor device 302 can correlate results of the 2D and 3D analysis to yield object data at object data block 514. Object data can include, for example, a location, speed, an acceleration and/or trajectory of an identified object within the three-dimensional viewing space. Depending on the type of application, a hazard analysis and decision block 518 can generate suitable outputs or operator feedback based on the correlated object data. In some embodiments, imaging sensor device 302 can interface with an industrial control or safety system, a vehicle safety system, or other such system to implement control features based on object detection. Accordingly, outputs generated by the sensor device can include control instructions to an associated control or safety system (e.g., a programmable logic controller or other safety automation controller, an engine control unit of a mobile vehicle, etc.) to alter operation of a machine or system based on the object data, safety outputs to an associated safety system (e.g., a safety relay) that place an industrial system in a safe state based on the presence and movements of a human being within the viewing field, or other such outputs.

Imaging sensor device can also include a safety block 520 that monitors and diagnoses internal components and faults of the sensor device, including but not limited to power monitoring, vibration monitoring, and temperature monitoring. Accordingly, control outputs and messages generated by the hazard analysis and decision block 518 can additionally be a function of the diagnosis results generated by the safety block 520.

Figure 6:
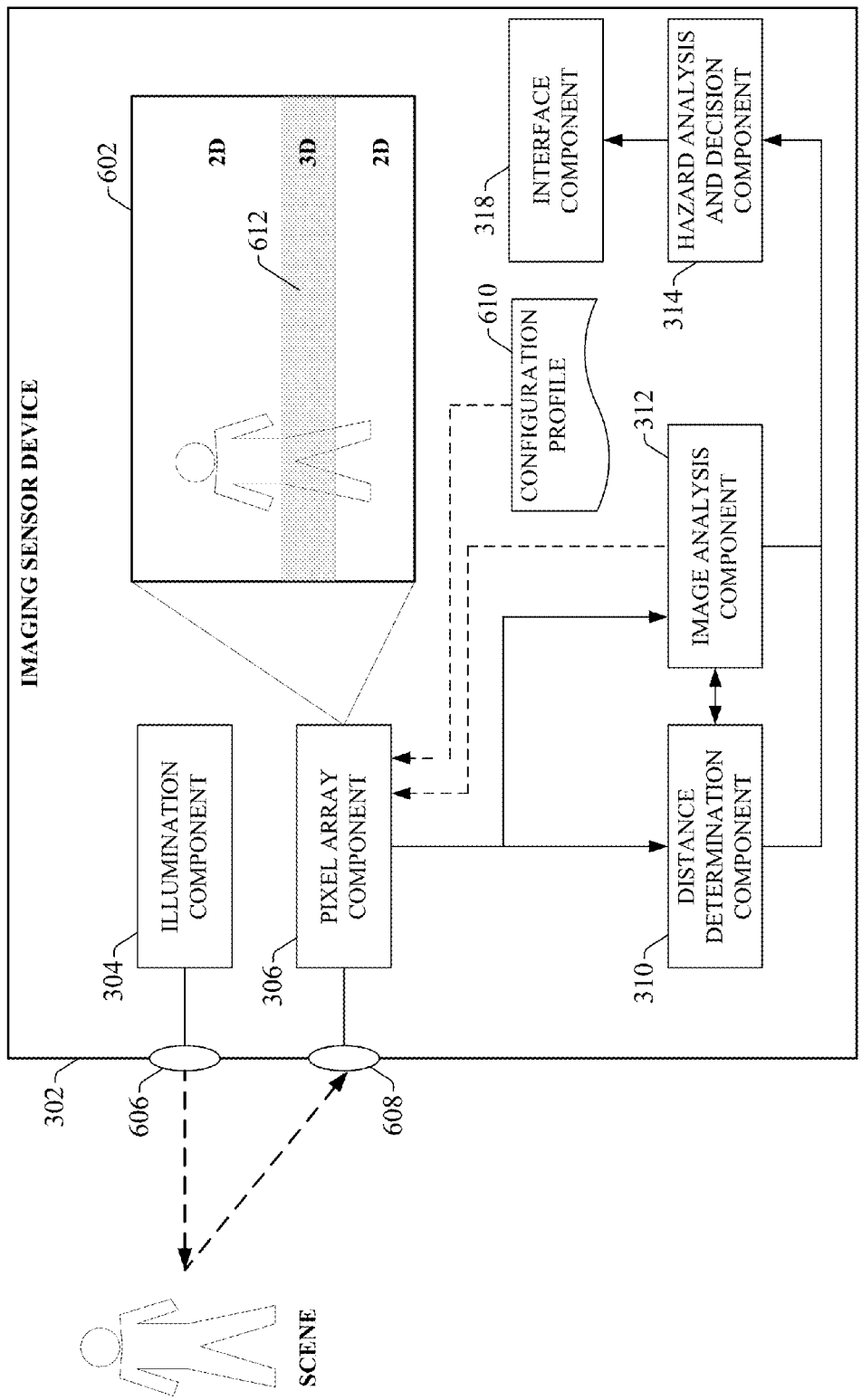
FIG. 6 is a block diagram illustrating components of an imaging sensor device.

FIG. 6 is a block diagram illustrating components of imaging sensor device 302 according to one or more embodiments. In this example, illumination component 304 controls emission of LED, laser, or remote phosphor light to the viewing field via emitter 606. In some embodiments, illumination component 304 can project a wide, substantially planar beam of pulsed LED illumination to the viewing field. For scanning type devices, illumination component 304 can sweep this planar beam over an angular range across the viewing area in an oscillatory manner to facilitate collection of image data over the entire viewing range. In other embodiments, the beam may remain static (trained in a fixed direction) so that objects can be detected and identified as they pass through the plane of the beam. In yet another example, illumination component 304 may project a wide beam of light pulses over the viewing field (e.g., a cone-shaped beam).

In some embodiments, illumination component 304 may uniformly illuminate the viewing field using a laser, LED, or remote phosphor light source. Alternatively, some embodiments of illumination component 304 may employ a patterned illumination technique whereby, rather than uniformly illuminating the viewing area, the illumination component 304 concentrates light in spots spaced with a certain distance over the viewing area. This technique can improve reliability of detection of small objects and of objects with low reflectivity. In such embodiments, the size of each spot of light can be defined based on the effective size of the pixels and the lens characteristics of the receiving lens element 608 of the sensor device. The receiving lens element 608 is sized relative to the spot size such that the image of a spot on the receiving lens element 608 covers at least the light sensitive area of one pixel. In a variation of this technique, the illumination component 304 or the lens design can also be configured to modulate the illumination intensity of the emitted spots, such that high brightness spots and low brightness spots are interlaced across the viewing area simultaneously. This technique can facilitate reliable detection of bright and dark objects within a single image frame. In an example implementation, the focused spots of illumination can be achieved by placing a squared lenslet comprising square or rectangular apertures in front of the LED, laser, or remote phosphor light source. The locations of the apertures on the lenslet define the spot pattern. To ensure accurate detection with small object sizes, the spot pattern can be defined such that at least two horizontal spots and two vertical spots cover the minimum size of object at the given distance from the receiving lens element 608.

Lens element 608 receives light reflected from the viewing field, and pixel array component 306 performs processing on the pixels of the resulting image data. As noted above, imaging sensor device 302 allows portions of the resulting pixel array 602 to be selected for 3D (distance or depth) processing and analysis, while the remaining portions of the pixel array are processed using 2D (imaging) analysis. In the example depicted in FIG. 6, a horizontal band 612 across a middle section of the pixel array 602 has been selected for 3D analysis, while the remaining portions of the pixel array 602 above and below the selected band 612 will be processed using 2D analysis. In some embodiments, pixel array component 306 identifies and groups the pixels into 2D and 3D sections based on a predefined configuration profile 610 specifying one or more areas of the pixel array 602 for which 3D analysis is to be performed. Alternatively, pixel array component 306 may be configured to dynamically select the areas of the pixel array on which 3D analysis is to be performed, as will be described in more detail below.

Figure 7:
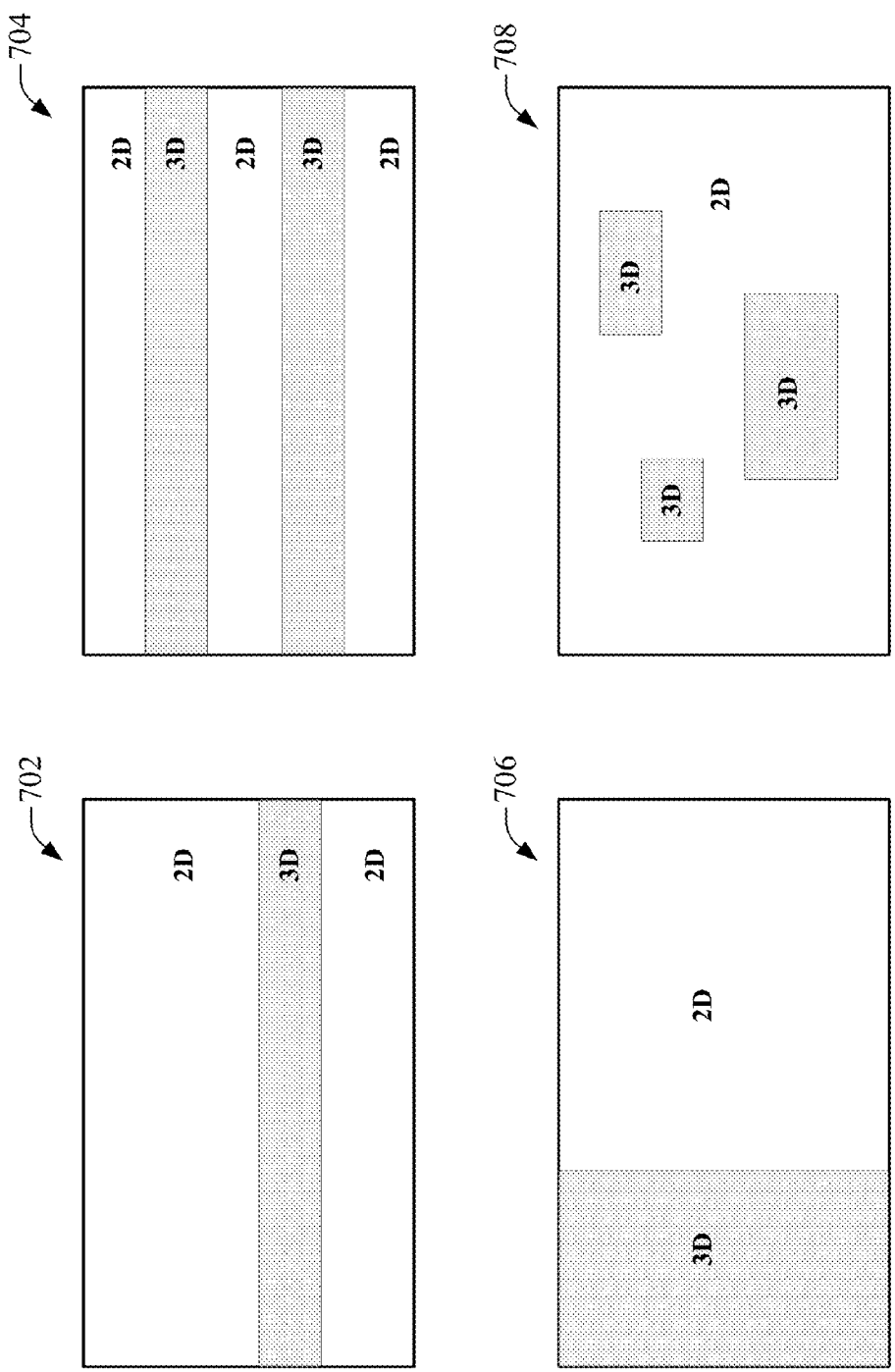
FIG. 7 is an illustration of example pixel array groupings.

Although FIG. 6 depicts the area of 3D processing as a single horizontal band across the middle of the pixel array, it is to be appreciated that substantially any manner of pixel grouping can be managed by pixel array component 306. FIG. 7 illustrates other example pixel groupings. In addition to the single horizontal band depicted in pixel array 702, pixels may also be grouped into multiple 3D bands (either horizontal or vertical), as shown in example pixel array 704. Pixel array 706 depicts a split-screen type of pixel grouping, in which a left-side portion of the pixel array is selected for 3D analysis, while 2D analysis is performed on the right-side portion. Pixels may also be grouped into non-contiguous pixel clusters of various sizes, as shown in example pixel array 708.

In an example scenario wherein the imaging sensor device 302 is used to monitor an area of an industrial facility, it may be known that certain areas of the viewing field correspond to potentially hazardous zones, while other areas of the viewing field correspond to safe zones that pose little or no risk to operators. Accordingly, a system designer may define a section of the pixel array that encompasses the known hazardous areas for 3D analysis. These pixel area definitions can be stored in configuration profile 610 and leveraged by pixel array component 306 to group pixels of the pixel array accordingly for group analysis. Portions of the pixel array 602 that are not selected for 3D analysis will be processed using 2D analysis, which is less computationally intensive than 3D analysis. By limiting 3D analysis to crucial subsets of the pixel array 602 and performing 2D analysis on the remaining portions of the array, overall processing time can be reduced relative to performing 3D analysis on the entire image.

In another example, a ceiling-mounted imaging sensor device may be oriented to face downward with the line of site substantially perpendicular to the floor, in order to monitor traffic through an entrance gate to a room or zone of interest. In this example, it may only be necessary to perform 3D analysis on a middle band of the pixel array corresponding to the pathway to the entrance gate. Accordingly, a system designer can define this area of the pixel array 602 and save these settings in the configuration profile 610.

Imaging sensor device 302 can support any suitable technique for allowing a user to define 3D zones one the pixel array 602. For example, an interface application executable on a personal computing device (e.g., tablet computer, laptop computer, desktop computer, mobile phone, etc.) may be used to facilitate data exchange between the computing device and the imaging sensor device 302. The interface application can generate and render configuration display screens capable of receiving input data from a user that set configuration parameters and definitions for the sensor. One or more configuration display screens may allow a user to define the areas of 3D analysis by entering x-y coordinates that define the sections of the pixel array 602 for which 3D analysis is to be performed. Alternatively, the configuration display screens may allow the user to draw (using a mouse or stylus) boundary lines (either linear or curved) that define the areas of 3D analysis. If the imaging sensor device 302 has been trained on the viewing area, the configuration screens can display a live image or a screenshot of the viewing area and allow the user to draw the 3D analysis boundary lines as an overlay on the image or screenshot.

Upon receipt of live pixel array data, and after the pixel array component 306 has grouped the pixels into respective 3D and 2D zones, image analysis component 312 performs 2D imaging analysis on those portions of pixel array 602 that were not designated by pixel array component 306 for 3D analysis. As noted above, imaging sensor device 302 can employ 2D imaging analysis to identify and classify objects within the image frame. Classification of objects can be based on pre-defined classes of objects that the imaging sensor device 302 has been trained to identify, including but not limited to human beings, particular types of vehicles (e.g., forklifts, trolleys, etc.), a manufactured part, a pallet, or other such object classifications.

In some embodiments, one or both of the pixel array component 306 or the image analysis component 312 can be configured recognize instances in which two or more non-contiguous groups of pixels of the pixel array 602 belong to a common object or person that may be partially obscured within the image. In an example scenario, an operator may enter the image frame, but may be partially obscured by another object within the frame such that only portions of the operator's legs or feet are directly visible to the sensor device. The pixels of the pixel array 602 corresponding to the operator's left and right legs or feet may comprise separate, non-contiguous pixel groups, since the operator is obscured above the knees. The image analysis component 312 may be trained recognize lower-body human features, and therefore recognizes that two separate detected objects identified as human legs which are oriented a certain way with respect to one another within the frame belong to a common person, and are indicative of a human presence within the image. Accordingly, image analysis component 312 can identify and classify the two objects as human legs, and instruct the pixel array component 306 to associate the two detected objects for collective analysis under the assumption that the two objects correspond to a human being.

Concurrently or in coordination with the 2D image analysis, distance determination component 310 can perform 3D analysis on the pixels comprising the defined 3D portion of the pixel array 602 to determine a distance value associated with each of those pixels. The distance value measured for a pixel represents the distance of the object or surface from the imaging sensor device with respect to the pixel of the sensor device. Collectively, the distance values for a set of pixels comprising an image are referred to as a point cloud.

The analysis technique employed by the distance determination component 310 to measure the distance values depends on the type of illumination and 3D analysis supported by the device. For example, for imaging sensor devices that employ phase shift analysis, the distance determination component 310 can monitor the phase shift of a reflected light beam received at a photo-receiver and compare this phase shift with the phase of the light beam emitted by the illumination component 304. The distance is then determined as a function of the relative phase shift between the emitted and received light.

Other types of imaging sensor that employ pulsed light illumination measure the time duration between emission of a light pulse by the illumination component 304 and receipt of a reflected light pulse at the photo-receiver for each pixel, and determining the distance as a function of this duration. In such embodiments, the distance determination component 310 may monitor the electrical output of the photo-receiver (which is a function of the intensity of light incident on the surface of the photo-receiver) and generate a waveform representing the reflected light pulse. The front edge of the returned light pulse can then be identified based on analysis of the waveform data, which represents the time at which the light pulse was received at the lens element 608. The distance determination component 310 can then compare this time with the time at which the emitted light pulse was sent by the illumination component 304. The difference between the two times represents the time-of-flight for the pulse, from which the distance information for the pixel corresponding to the photo-receiver can be derived. By performing waveform reconstruction and distance determination for each pixel in the 3D analysis portions of the pixel array 602, a 3D point cloud can be derived for the selected areas of the pixel array 602.

Some embodiments of imaging sensor device 302 may support dynamic definition of 3D analysis zones based on object detection and classification by the 2D image analysis component. For example, during normal operation the imaging sensor device 302 may perform 2D analysis on the entire pixel array 602 until an object of a specified classification is detected within the viewing field. In response to detection of such an object (e.g., a person, a vehicle, etc.) within the viewing field, the image analysis component 312 may provide information to pixel array component 306 identifying the object and its location within the pixel array 602. Pixel array component 306 can then define one or more pixel groups corresponding to the identified object, and instruct distance determination component 310 to begin performing 3D analysis on those groups of pixels, so that both the location and distance of the object can be tracked. In some embodiments, the pixel array component 306 and image analysis component 312 can operate in conjunction to move the defined 3D analysis portion of the pixel array 602 to track with the detected object as long as the object remains within the frame. Thus, embodiments of the imaging sensor device 302 can use 2D imaging analysis to recognize objects of interest within the frame, and instruct pixel array component 306 where 3D analysis should be performed. In this way, the imaging sensor device 302 can continuously collect TOF information for objects of interest while substantially minimizing the areas of the pixel array on which 3D analysis is performed, optimizing processing and response times.

Figure 8:
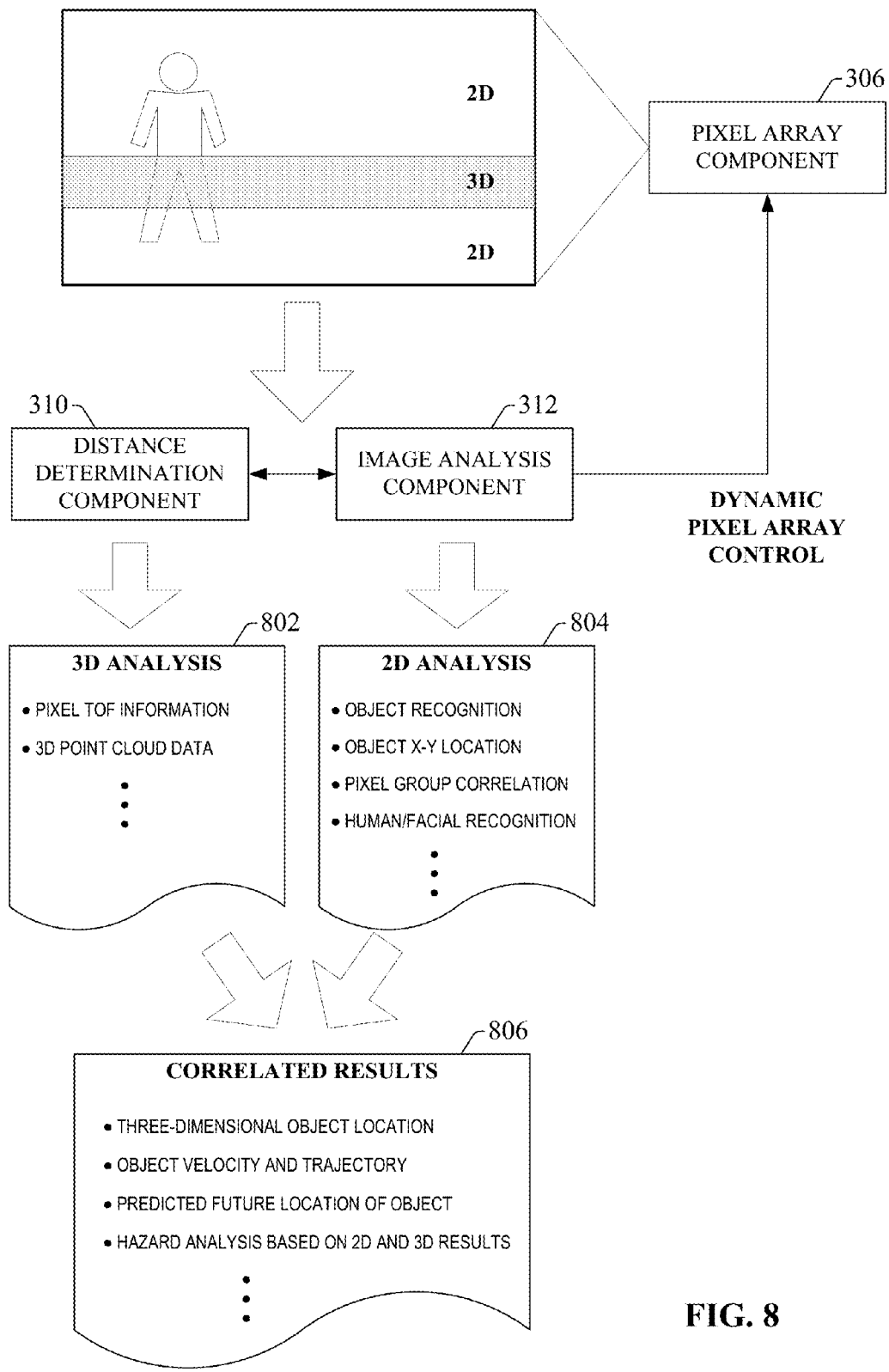
FIG. 8 is a block diagram illustrating correlation of 2D (imaging) and 3D (distance) information by an imaging sensor device.

The imaging sensor device 302 (or a separate safety controller) can correlate results of the 2D and 3D analyses and determine suitable control or messaging outputs based on object classification, location, velocity, and/or trajectory. FIG. 8 illustrates correlation of 2D (imaging) and 3D (distance) information by the imaging sensor device or safety controller. As described above, image analysis component 312 can generate 2D analysis results 804, including but not limited to object recognition or classification, x-y location of objects, correlation of pixel groups determined to belong to a common object, human and/or facial recognition based on image analysis, and other such data. Distance determination component 310 generates 3D analysis results 802 (time-of-flight distance information) for each pixel, yielding 3D point cloud data for areas of interest (areas of the pixel array specified for selective 3D analysis, either manually by a system designer or dynamically by the sensor based on information provided by image analysis component 312, as described in previous examples). The imaging sensor device or safety controller can correlate all or selected portions of these data sets to yield correlated results 806. These correlated results can include, but are not limited to, object location, velocity, and trajectory within the three-dimensional space; a predicted future location of an object of interest based on the three-dimensional location, velocity, and trajectory; or other such information.

In a non-limiting example of 2D and 3D result correlation, image analysis component 312 may identify objects within the image frame that correspond to a class of objects for which 3D analysis is required. In response, the imaging sensor device can apply 3D analysis to the region of the pixel array 602 corresponding to the detected object to obtain distance information for the object over time, while 2D analysis can track the x-y location of the object within the frame. By correlating these results, the object's instantaneous position, velocity, acceleration, and trajectory within the three-dimensional viewing space can be determined. For embodiments in which the imaging sensor device or safety controller supports prediction of future object position, the sensor may also determine whether the object is predicted to be within a particular subspace of the three-dimensional viewing field based on the current location, speed, and trajectory, and generate a control or feedback output based on risk analysis using this prediction.

In another example, the imaging sensor device or safety controller may coordinate object classification and edge detection (2D analysis results) with depth analysis (a 3D analysis result) in order to obtain depth information for all pixels enclosed within the edges of an identified object. For example, when an object enters the viewing field, the imaging sensor device may leverage 2D imaging analysis to identify and classify the object as corresponding to a defined object class requiring 3D analysis. The 2D analysis may further include edge detection, which identifies the visible edges or boundaries of the object. The imaging sensor can then perform selective 3D analysis on all pixels within the object boundaries identified via 2D analysis.

Figure 9A:
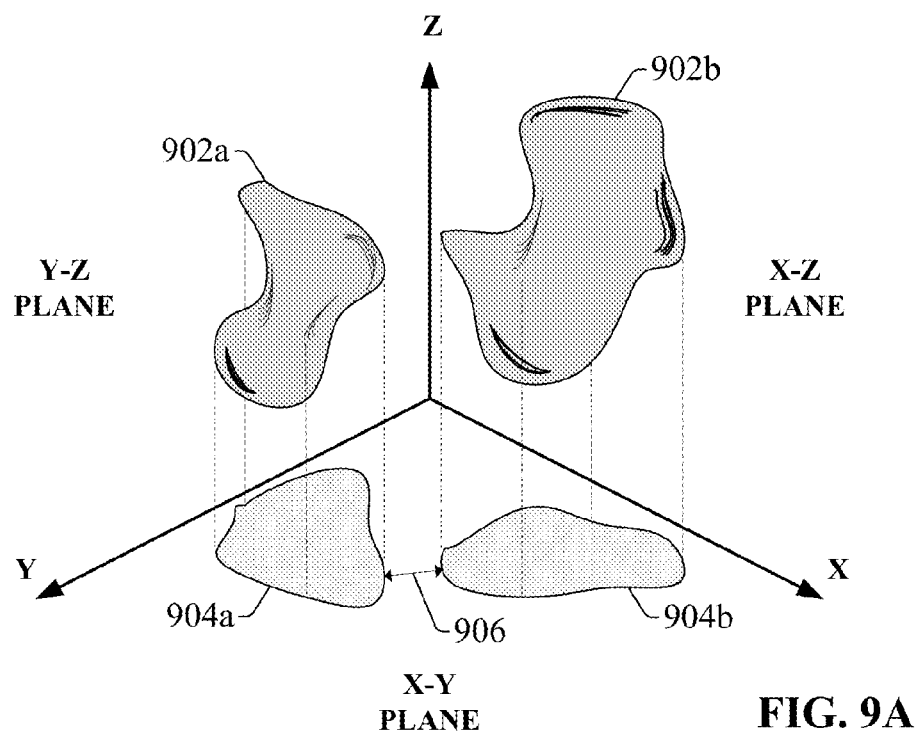
FIG. 9A is a graph illustrating distance measurement using projection of three-dimensional objects onto two-dimensional planes.

As noted above, one or more embodiments of the imaging sensor device (or associated safety controller) can determine a location of a first identified object relative to another detected object; for example, the location of a human operator relative to a hazardous machine. This includes determining the distance of the first object from the second object within the three-dimensional space. In order to reduce the complexity and computational overhead of this three-dimensional distance calculation, some embodiments of the imaging sensor device or safety controller can estimate distances between objects by projecting three-dimensional object data onto two-dimensional planes. FIG. 9A is a graph illustrating distance measurement using projection of three-dimensional objects onto a two-dimensional plane. In this example, two objects 902a and 902b are detected in the viewing field based analysis of point cloud data generated by 3D analysis of image information collected by one or more imaging sensor devices. In order to simplify the calculation of distances between the detected objects, the one or more imaging sensor devices (or the safety controller that collects and aggregates the point cloud data from the one or more imaging sensor devices) project the three-dimensional objects onto the X-Y plane resulting in two-dimensional projections 904a and 904b. The system then calculates the minimum distance 906 between the two-dimensional projections 904a and 904b within the respective two-dimensional planes. As described in previous examples, the hazard analysis and decision component 314 can then perform decision-making and generate safety action outputs based on the classifications of the respective objects 902a and 902b and the calculated minimum distance 906.

Figure 9B:
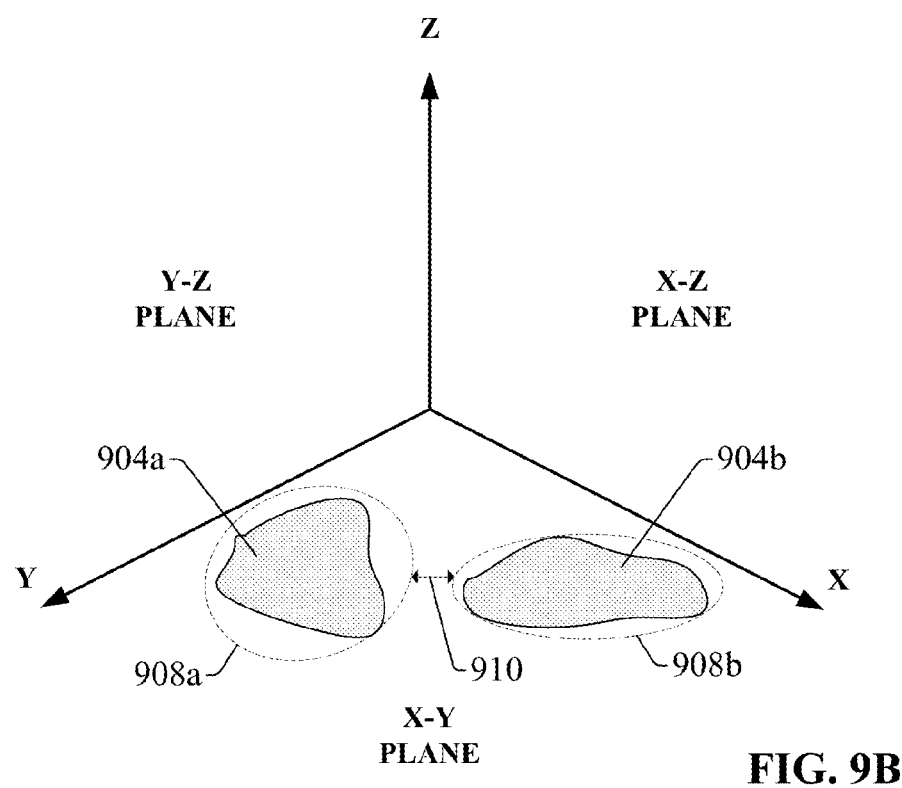
FIG. 9B is a graph illustrating distance measurement between the two detected objects using projection and encapsulation.

In some embodiments, minimum distance calculation can be further simplified by encapsulating the projected two-dimensional shapes within known geometric shapes and determining the minimum distances between the shapes. FIG. 9B is a graph illustrating distance measurement between the two detected objects using projection and encapsulation. FIG. 9B omits the three-dimensional objects 902a and 902b for clarity, and only shows the two-dimensional projections of those objects on the X-Y plane. In this example, the one or more imaging sensor devices or the safety controller selects, for each of the two-dimensional projections 904a and 904b, a known geometric shape 908 capable of closely encapsulating the two-dimensional projection. In the illustrated example, the two-dimensional projections 904a and 904b are encapsulated within ellipses. However, in some embodiments the one or more imaging sensor devices (or the safety controller) can select a known geometric shape from a library of known shapes (e.g., a rectangle, a triangle, a circle, etc.) determined to best fit the two-dimensional projection. The minimum distance 910 between the respective geometric shapes 908a and 908b is then calculated. Encapsulating the two-dimensional projections within known geometric shapes transforms the irregularly shaped projections 904a and 904b into regular geometric shapes, thereby reducing the complexity involved in determining the minimum distance between irregularly shaped projections within the two-dimensional planes. Since the edges of the geometric shapes will always lay outside of the edges of the projections, the minimum distance between the geometric shapes will never be greater than the minimum distance that would be calculated between edges of the actual projections; that is, the distances between the geometric shapes will always be equal to or less than the distance between the projections. Consequently, although the calculated minimum distances between the encapsulating shapes may not be as accurate as the distances between the projections themselves, the inaccuracy will always trigger an earlier safety response (by virtue of the closer calculated distance) than would be the case if the distances between the projections are used.

Figure 10:
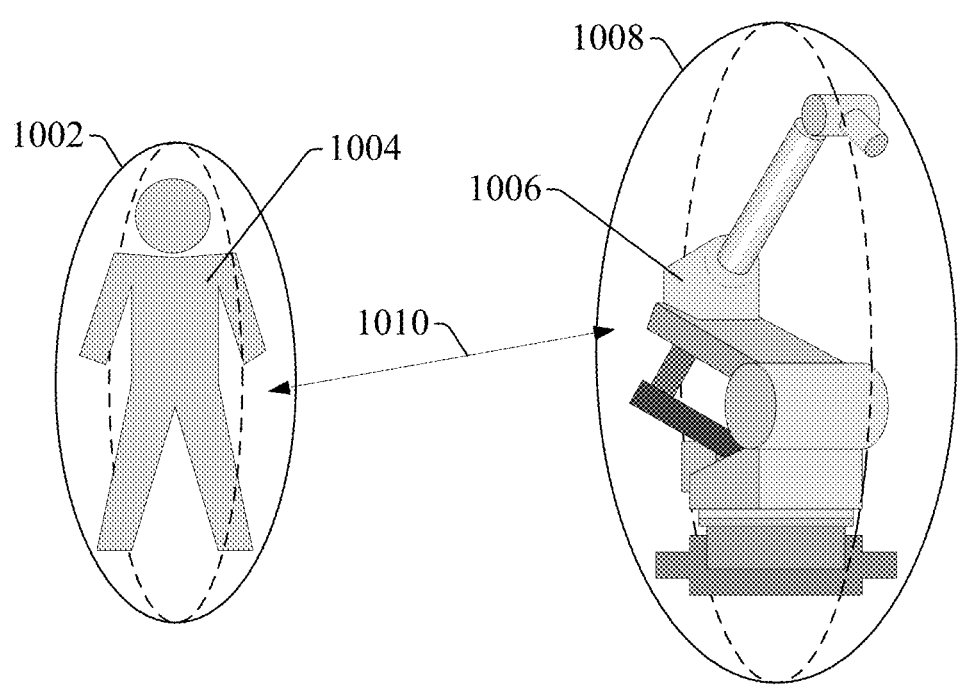
FIG. 10 is a conceptual diagram illustrating three-dimensional encapsulation.

In some embodiments, the encapsulation technique described above can also be implemented in the three-dimensional space without first projecting the shapes onto the two-dimensional planes. FIG. 10 is a conceptual diagram illustrating three-dimensional encapsulation according to one or more embodiments. In the illustrated example, two objects—an operator 1004 and a robot 1006—are detected and classified based on analysis of point cloud data generated by one or more imaging sensor devices (e.g., based on distance analysis performed by the distance determination component 310). In order to determine the minimum distance between the two objects without the need to determine the nearest points between two irregularly shaped three-dimensional objects (which would render the computation more complex), the system encapsulates both objects 1004 and 1006 within known three-dimensional geometric shapes 1002 and 1008. In this case, three-dimensional ellipses are used. However, the system can select suitable shapes from a library of known shapes determined to most closely encapsulate each object (e.g., cylinders, cubes, spheres, egg shapes, etc.). Once encapsulated, the system can calculate the minimum distance 1010 between the two geometric shapes.

The examples illustrated in FIGS. 9 and 10 for determining distances between objects are only intended to be exemplary, and it is to be appreciated that any suitable computational technique for calculating distances between objects are within the scope of one or more embodiments of this disclosure.

Returning now to FIG. 6, based on the particular application being executed by the sensor device, hazard analysis and decision component 314 can be instructed to generate a suitable control, safety, or feedback output when the object classification, position, speed, acceleration, and/or trajectory satisfy a defined criterion. In some embodiments, interface component 318 may interface with a control device (e.g., an industrial controller, a safety relay, etc) over a hardwired or networked connection, and hazard analysis and decision component 314 can issue control instructions to the control device based on identity, position, and behavior of objects observed in the viewing field. In an example scenario, based on correlation of analysis results generated by the distance determination component 310 and the image analysis component 312, the imaging sensor device 302 may identify that a plant employee has entered the viewing field, and that the employee's current location, speed, acceleration, and trajectory may place the employee within a potentially hazardous area near a controlled industrial machine. In response, the hazard analysis and decision component 314 is instructed to issue a command to the industrial controller to place the machine in a safe mode (e.g., by placing the machine in an idle mode or a slowed operation mode, or by instructing a safety relay to remove power from certain movable components of the machine). In another example scenario, the hazard analysis and decision component 314 may be configured to generate feedback information to be rendered on a display device based on object identification and behavior. This can include, for example, customized warning messages recommending that a user follow an alternate path or relocate to a safe area within the monitoring area. For embodiments of the imaging sensor device 302 that support facial recognition, feedback messages generated by hazard analysis and decision component 314 may also be further customized based on an identity of the employee detected within the viewing field. Hazard analysis and decision component 314 may interface with a display device mounted within the monitored area, or may be targeted to a personal device associated with the identified employee.

Figure 11:
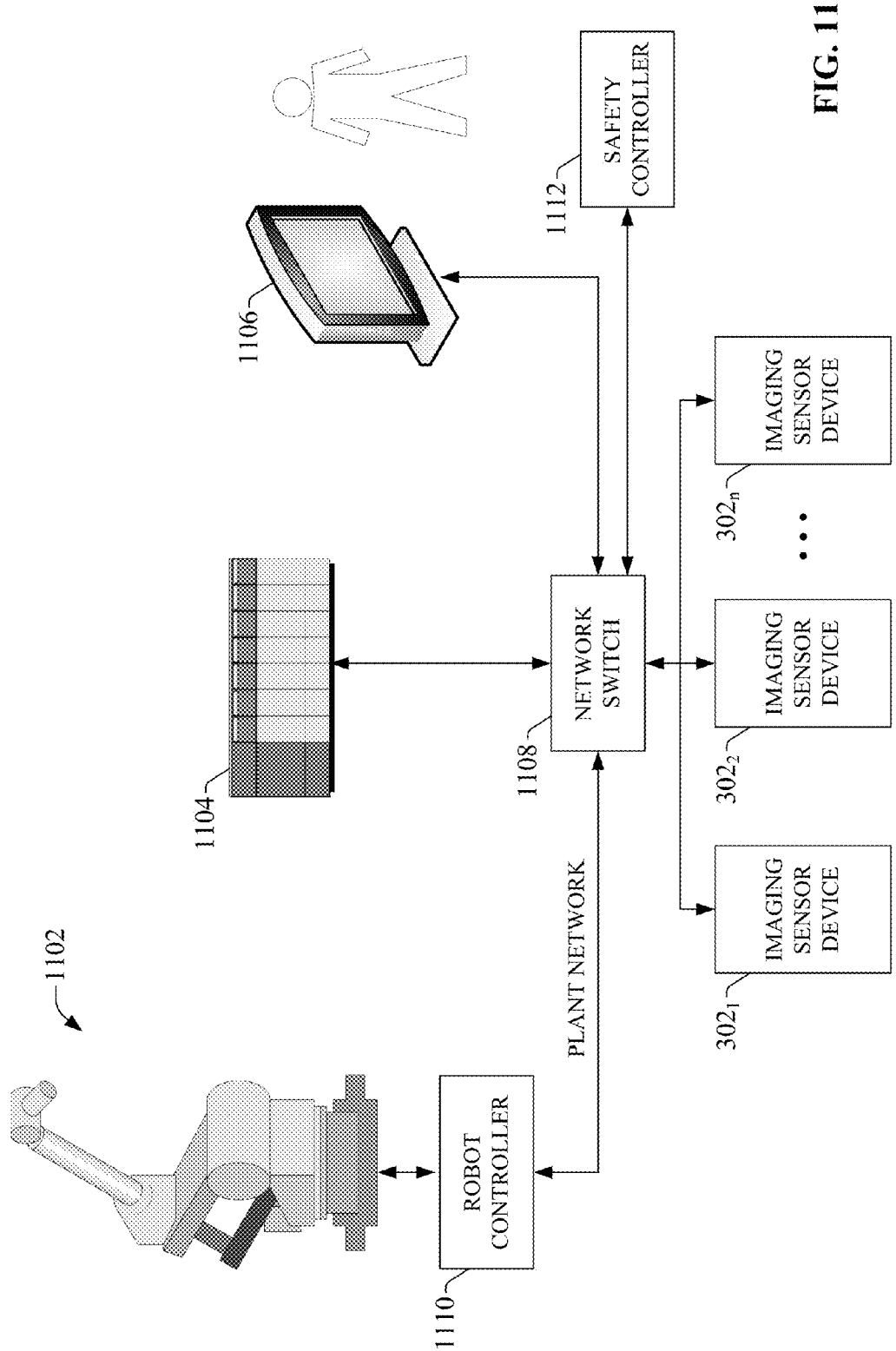
FIG. 11 is a diagram of an example architecture of an integrated control and safety system that utilizes one or more embodiments of the imaging sensor device.

The object detection and tracking features described above, together with the reduced processing load and commensurate improvement in decision-making and response time that results from minimizing the amount of 3D processing required, render the imaging sensor devices described herein suitable for safety applications, which require a high degree of safety integrity and fast response times in order to mitigate risk of injuries. FIG. 11 is an example architecture of an integrated control and safety system that utilizes one or more embodiments of the imaging sensor device described above. In this example scenario, an industrial robot 1102 or other type of industrial machine or system operates under the control and supervision of industrial controller 1104 (e.g., a programmable logic controller or other type if industrial automation controller). Although the industrial system is depicted in FIG. 11 as comprising a robot 1102, it is to be appreciated that other types of controlled industrial systems may also be used within this architecture, including but not limited to a motion system, a palletizing system, a stamping press, or other types of hazardous industrial systems. Robot 1102 may operate under direct control of robot controller 1110, which controls the robot 1102 in accordance with instructions and information provided by industrial controller 1104. Alternatively, industrial controller 1104 may interface directly with the robot's I/O and control the robot directly.

The architecture may also include a human-machine interface (HMI) 1106 that visualizes status, operational, and production data to an operator via one or more graphical screens. HMI 1106 may also allow the operator to issue limited control instructions to the control system or set values for one or more parameters (e.g., setpoint values) via the graphical screens.

One or more imaging sensor devices 302 are configured to monitor the environment surrounding the robot (the hazardous area). For configurations in which the imaging sensor devices 302 act as stand-alone safety control devices, the imaging sensor devices 302 are communicatively interfaced with one or both of the industrial controller 1104 and the robot 1102 or its associated robot controller 1110 to provided integrated vision-based safety control. Imaging sensor devices 302 may also interface with the HMI 1106 in order to deliver feedback messages or image data to the operator. Alternatively, the imaging sensor devices 302 may interface with a separate safety controller 1112 that aggregates imaging and point cloud data from the imaging sensor devices 302 and performs one or more of object detection, object classification, object tracking, decision-making, and safety response based on the aggregated data. The industrial controller 1104, robot controller 1110, HMI 1106, imaging sensor devices 302, and safety controller 1112 may all reside on a plant network or safety network; e.g., via one or more network switches 1108. Alternatively, imaging sensor devices 302 and/or safety controller 1112 may interface directly with one or both of the industrial controller 1104 or the robot controller 1110 via the controllers I/O.

Figure 12:
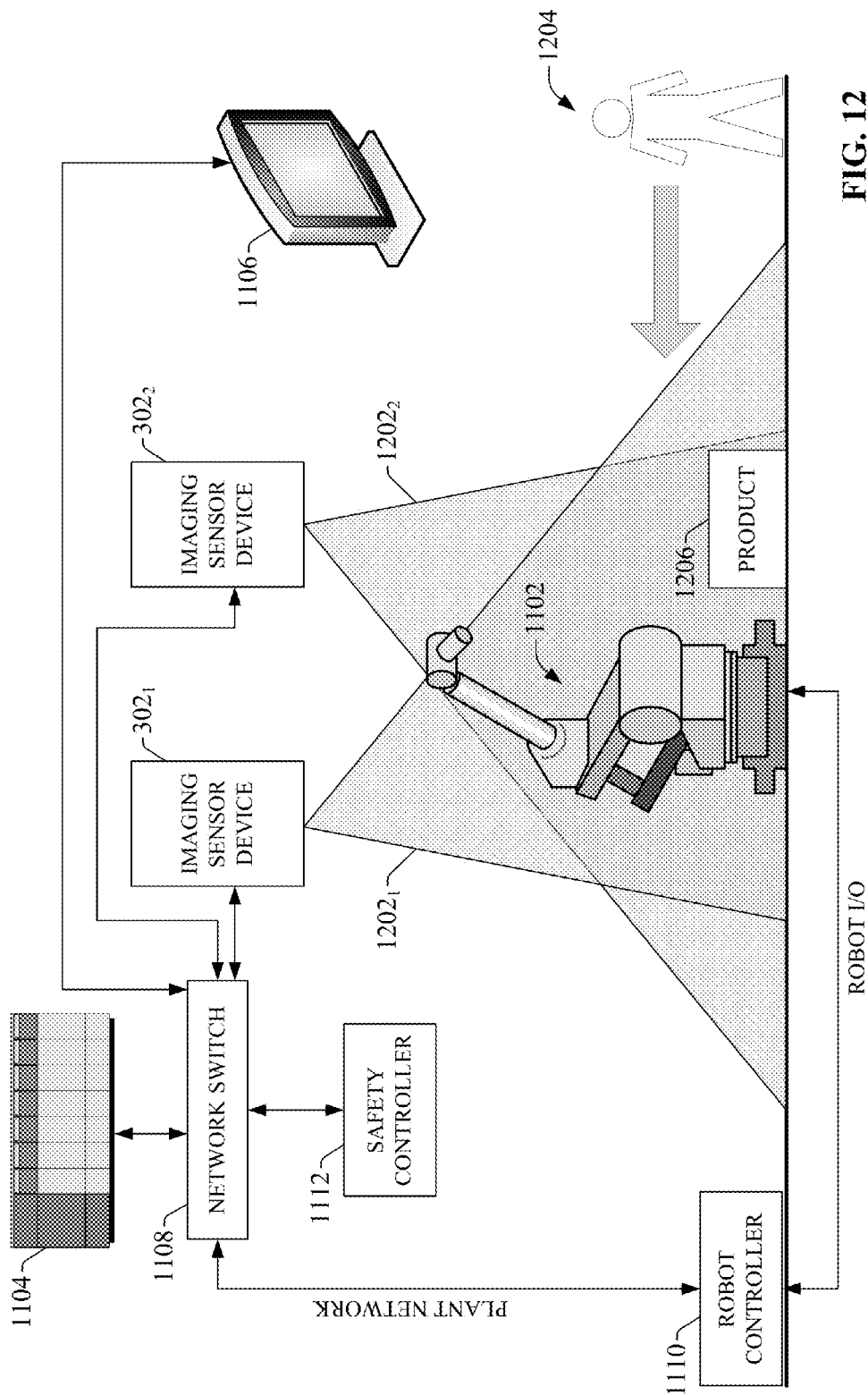
FIG. 12 is a diagram of an example implementation of the integrated control and optical safety monitoring architecture.

FIG. 12 is an illustration of an example implementation of the architecture depicted in FIG. 11. In this example, two imaging sensor devices 302$_1$ and 302$_2$ are mounted such that the sensor devices monitor the hazardous zone surrounding robot 1102 from two different angles. Although only two imaging sensor devices 302 are illustrated in FIG. 12, it is to be appreciated that more than two imaging sensors may be mounted around and trained on the hazardous area to yield additional imaging and point cloud data for analysis. The viewing space monitored by the imaging sensor devices 302$_1$ and 302$_2$ constitutes a safety zone in which objects will be detected, classified, and tracked by the imaging sensor devices 302$_1$ and 302$_2$ (and/or safety controller 1112) so that the behavior of robot 1102 can be suitable altered in response to detection of a hazardous condition.

Using the techniques described above, imaging sensor devices 302$_1$ and 302$_2$ or safety controller 1112 can identify and classify objects within the space defined by viewing fields 1202$_1$ and 1202$_2$. For example, imaging sensor devices 302$_1$ and 302$_2$ can be trained to identify product 1206 as a first object class ("product"), and to identify human operator 1204 as a second object class ("human"). When product 1206 enters the viewing field (e.g., when a conveyor system, another downstream robot, or a transportation vehicle delivers the product 1206 to be processed by robot 1102), imaging sensor devices 302$_1$ and 302$_2$ can perform 2D analysis on the image of the safety zone to identify the object, determine that the object belongs to the product classification, and allow robot 1102 and associated systems to continue cycling normally.

If an operator 1204 enters the viewing field, the imaging sensor devices 302$_1$ and 302$_2$ identify the operator as belonging to the human classification. A determination is also made regarding the current operating mode of robot 1102. This determination can be made by imaging sensor devices 302$_1$ and 302$_2$ or safety controller 1112 based on robot status information provided by industrial controller 1104. The current operating status of the robot 1102 determines whether the viewing field is safe to enter. That is, if the robot 1102 is currently stopped or disabled, or is performing a cycle that does not pose a risk of injury to operators within the monitored viewing field, detection of a human within the viewing field may not require a safety action to be performed by the imaging sensor device. If the robot 1102 is running a cycle that poses a potential risk to the operator within the viewing field, detection of an object classified as "human" within the viewing field causes one or more of the imaging sensor devices 302$_1$ and 302$_2$ or safety controller 1112 to generate a control output placing the robot 1102 in a safe mode. This may comprise, for example, sending a control output to industrial controller 1104 instructing the controller to disable the robot 1102 and any other sub-systems (e.g., conveyors) associated with the robot 1102. In another example, rather than disabling the robot 1102, the imaging sensor devices 302$_1$ and 302$_2$ may instruct the industrial controller 1104 to initiate a different robot operating cycle that poses no risk of injury to operator 1204.

In some embodiments, initiation of the control output, and the type of control output generated, may be based on a correlation between the operator's location and behavior and that of the robot 1102. For example, the imaging sensor devices (or safety controller) may determine the robot's current position, speed, and trajectory based on 2D analysis, 3D analysis, or a correlation of both types of analysis on the portion of image frame corresponding to the robot 1102. Similar data can be obtained for the human operator 1204. Imaging sensor devices 302$_1$ and 302$_2$ can then identify a level of risk based on such factors as the human operator's location relative to the machine, the trajectories of the machine and the operator relative to one another, or other such information. When the level of risk based on these factors exceeds a threshold, one or more the imaging sensor devices 302$_1$ and 302$_2$ (or an associated controller) can initiate a suitable safety output to change the operation of robot 1102 in a manner that mitigates the risk, or to disable the robot 1102 entirely. Additionally, if the determined level of risk becomes elevated given the monitored factors, but has not yet reached the threshold for initiation of a safety action, imaging sensor devices 302$_1$ and 302$_2$ may generate and deliver a feedback message warning the operator of the potential risk and recommending a behavior (e.g., relocating to a different area) that will mitigate the risk. The imaging sensor devices 302$_1$ and 302$_2$ can deliver this message to HMI 1106, to a personal device carried by the operator 1204, to a display board mounted in the monitored area, or other such devices.

To improve reliability of human detection while minimizing processing load and maintaining acceptable response times, imaging sensor devices 302$_1$ and 302$_2$ can be configured to perform selective 3D analysis on certain pixels of the image frame of the viewing field, while performing faster 2D analysis on the remaining portions of the image frame. For example, one or both of the imaging sensor devices 302$_1$ and 302$_2$ may be configured to perform 3D analysis on portions of the image immediately surrounding the robot 1102, while performing 2D analysis on the outer perimeter of the image frame. In another scenario, one or both of the imaging sensor devices 302$_1$ and 302$_2$ may be configured to perform 2D analysis over the entire pixel array of the image during normal operation until an object that does not conform to the "product" classification enters the viewing field.

In response to detection of a non-product object entering the viewing field, the pixel array component 306 of the sensor can designate an area of the pixel array corresponding to the object for 3D analysis in order to obtain height information and profile over time for the new object, which can be used by the sensor to assist in determining whether the new object corresponds to the "human being" classification. The pixel array component 306 can dynamically move the portion of the image designated for 3D analysis to track with the object as it moves through the viewing field (e.g., based on object detection information provided by the image analysis component 312).

In another example of dynamic hazard analysis, one or more of the imaging sensor devices $302_1$ and $302_2$ may be configured to adjust the size of the 3D analysis pixel area (e.g., the hazard zone) based on a current hazard level determined via 2D image analysis. For example, an area of the pixel array designated for 3D analysis may correspond to an area surrounding the robot 1102. One or more of the imaging sensor device $302_1$ and $302_2$ may adjust a size of the 3D analysis area surrounding the robot based on detected conditions. For example, based on 2D analysis of the pixel array, an imaging sensor device may determine a speed at which the robot 1102 is currently operating. If this speed is determined to exceed a threshold, implying a higher risk of injury given expected human response times, the portion of the pixel array for which 3D analysis is performed may be increased to a larger area surrounding the robot 1102. When the imaging sensor device 302 determines that the robot 1102 is operating at a slower speed, the risk level is assumed to be lessened, and the 3D analysis portion of the pixel array is made smaller to allow operators freedom to approach the robot 1102 more closely. In some such embodiments, the size of the 3D portion of the pixel array may be a continuous function of the determined speed of the robot.

For system configurations in which 3D analysis and safety control is performed by the safety controller 1112, the imaging sensor devices $302_1$ and $302_2$ may provide point cloud information (pixel-level distance information calculated by the respective sensor devices) to the safety controller 1112 for centralized analysis. The point cloud information provided by the sensor devices represents 3D distance data for multiple angular views of the monitored area. The safety controller 1112 can aggregate this multi-angular point cloud data to yield a composite three-dimensional representation of the monitored area, and perform object detection, classification, and analysis on selected portions of the composite three-dimensional representation. This analysis can include, but is not limited to, detection and classification of objects within the three-dimensional representation; determination of object location, speed, acceleration, and/or trajectory; calculation of minimum distances between selected objects (e.g., using one or more of the techniques described above in connection with FIGS. 9 and 10), or other such analysis.

The configuration depicted in FIG. 12 has a number of advantages over a light curtain solution. For example, light curtain transmitters and receivers are typically mounted vertically on either side of an entryway, exposing those components to possible damage by passing objects. Mounting the imaging sensor devices $302_1$ and $302_2$ on the ceiling mitigates the risk of damage by placing the monitoring device outside the reach of passing objects. Moreover, light curtains are often muted to allow a product to pass through the entryway at particular defined durations during the operating cycle (that is, durations during which a product is expected to pass through the light curtain), and enabled during the remaining portions of the cycle. Since muting of the light curtain in such scenarios is a function of the particular portion of the operating cycle being executed, this method opens the possibility that a human may pass through the light curtain undetected during those times when the light curtain is muted. By contrast, since imaging sensor devices $302_1$ and $302_2$ (and or their associated safety controller 1112) are able to classify detected objects as corresponding to a "human" classification and alter control based on this object classification, the imaging sensor devices $302_1$ and $302_2$ are able to perform more direct and intelligent muting based on object detection and classification rather than being cycle-dependent.

Figure 13:
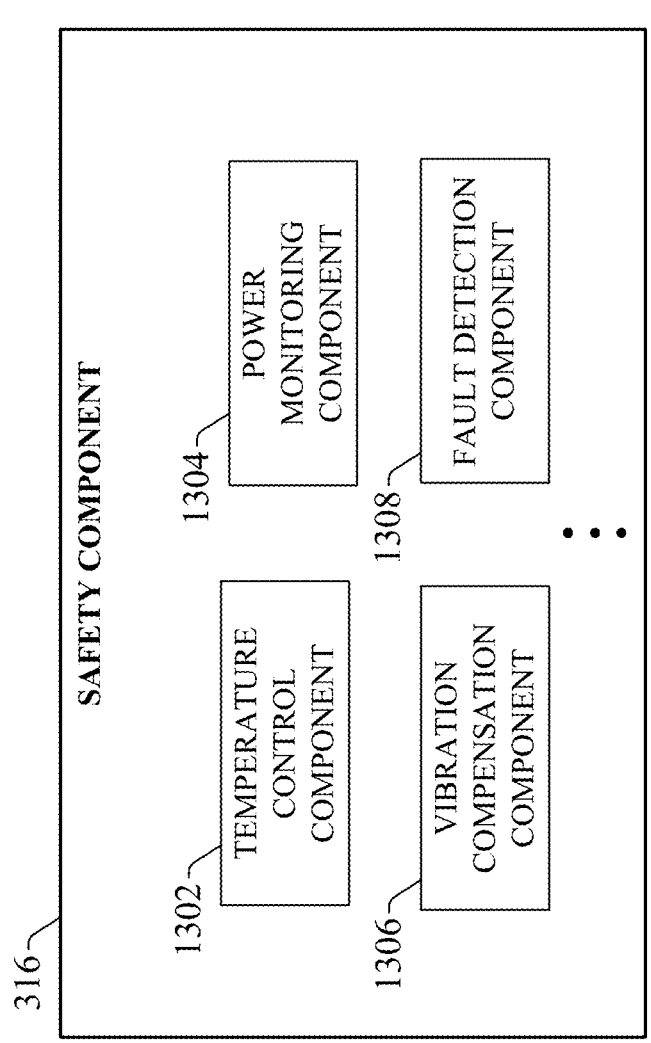
FIG. 13 is a block diagram of an example safety component that can be integrated in one or more embodiments of an imaging sensor device.

To ensure safety integrity of the imaging sensor device, one or more embodiments may include a safety component 316 that implements one or more features for ensuring reliability and accuracy of the sensor in a range of operating conditions, improving the safety integrity of the sensor device. In general, safety component 316 is configured to perform fault monitoring and diagnostic analysis on a range of conditions that may impact the integrity of the sensor operation, and trigger actions designed to mitigate hazards that may arise when a monitored deviates from a safe state (e.g., instruct the hazard analysis and decision component 314 to switch a machine to a safe state, output a warning message, etc.) FIG. 13 illustrates an example safety component 316 that can be integrated in one or more embodiments of imaging sensor device 302. Safety component 316 can comprise one or more sub-components that perform various types of diagnostics, fault monitoring, and compensation for temperature, power, vibration, and internal component faults. However, it is to be appreciated that other types of fault monitoring and diagnostic capabilities may be supported by various embodiments of safety component 316, and are within the scope of this disclosure.

Temperatures within the sensor device may have an impact on the distance values generated by the sensor components. Accordingly, safety component 316 can include a temperature control component 1302 configured to adjust the distance values generated by distance determination component 310 to compensate for measured deviations in temperature. Some embodiments of temperature control component 1302 can also include mechanisms to regulate the sensor's internal temperature to maintain a specified optimal operating temperature, as well as redundant fault detection mechanisms to ensure that the temperature compensation meets or exceeds a defined minimum safety integrity level (e.g. SIL 2, SIL 3, ASIL 2, ASIL 3, etc.).

Safety component 316 can also include a power monitoring component 1304 configured to monitor the internal rails that provide power to crucial components, and perform compensation actions in response to detected voltage deviations from rated tolerances. In this regard, some embodiments of imaging sensor device 302 may include a redundant power supply to ensure that a failure of the main supply does not prevent continued operation of the sensor device. Vibration compensation component 1306 can be configured perform appropriate compensation actions in response to monitored vibrations induced on the sensor.

Fault detection component 1308 can be configured to monitor and diagnose internal sensor faults, and to generate information or instructions to the hazard analysis and decision component 314 based on the fault information. Also, to further comply with safety integrity level requirements, processor(s) 318 can be specified as a SIL- or ASIL-rated processor to ensure that the imaging sensor conforms to required safety standards.

Figure 14:
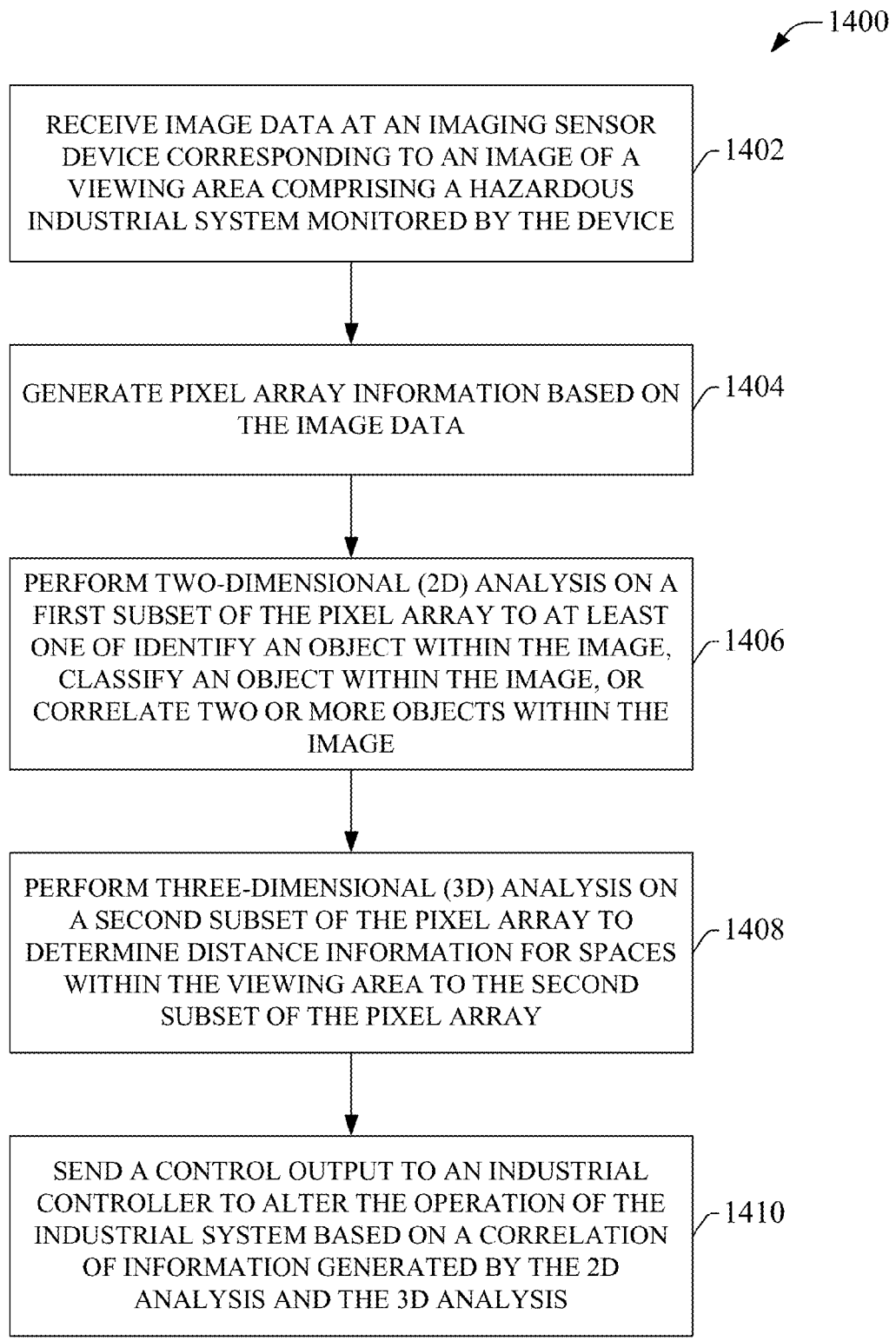
FIG. 14 is a flowchart of an example methodology for integrating an imaging sensor device with an industrial control system to provide optical safety.
Figure 15:
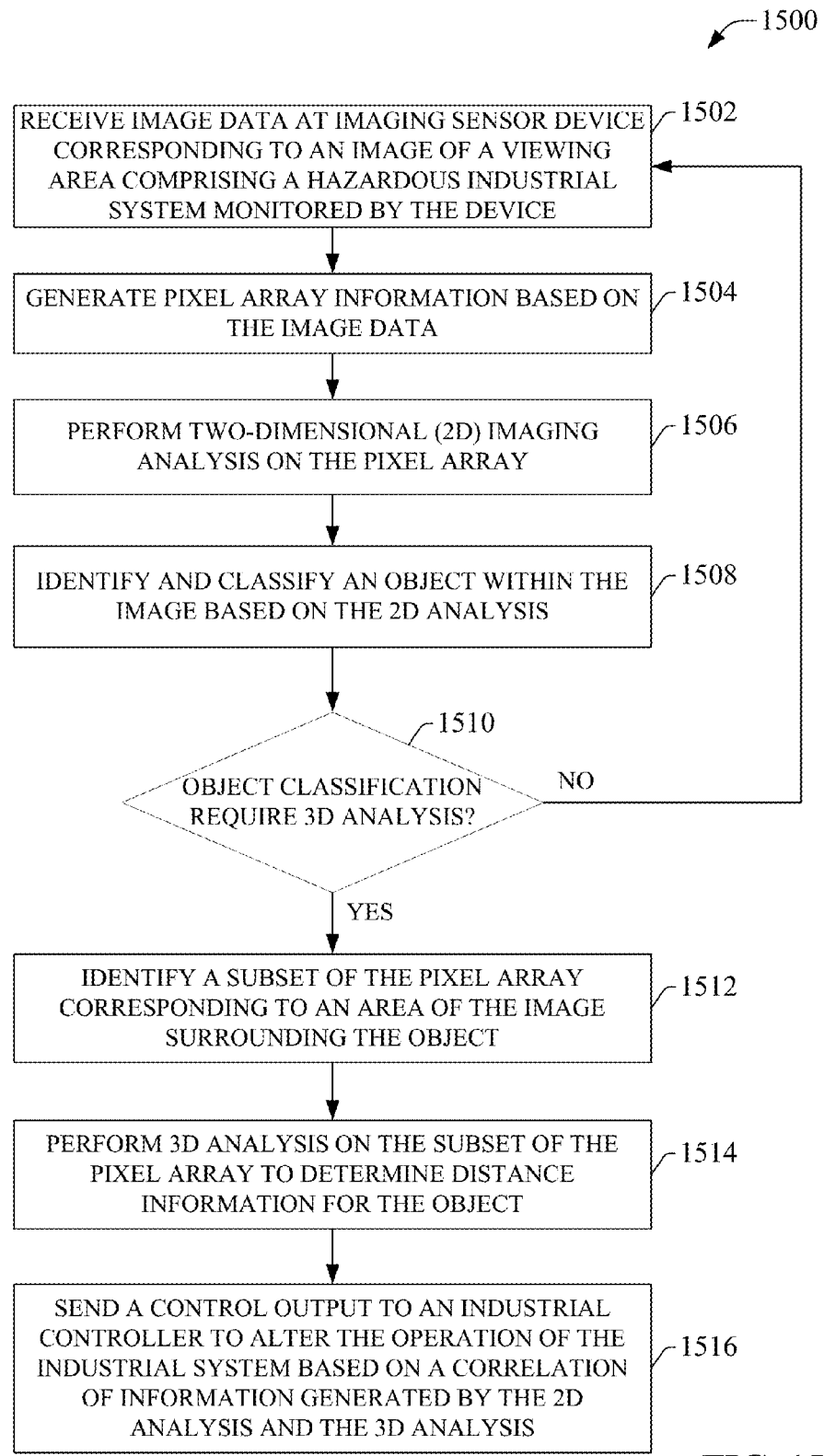
FIG. 15 is a flowchart of an example methodology for dynamically selecting a portion of a pixel array for selective 3D analysis in an industrial safety system that utilizes optical area monitoring.
Figure 16:
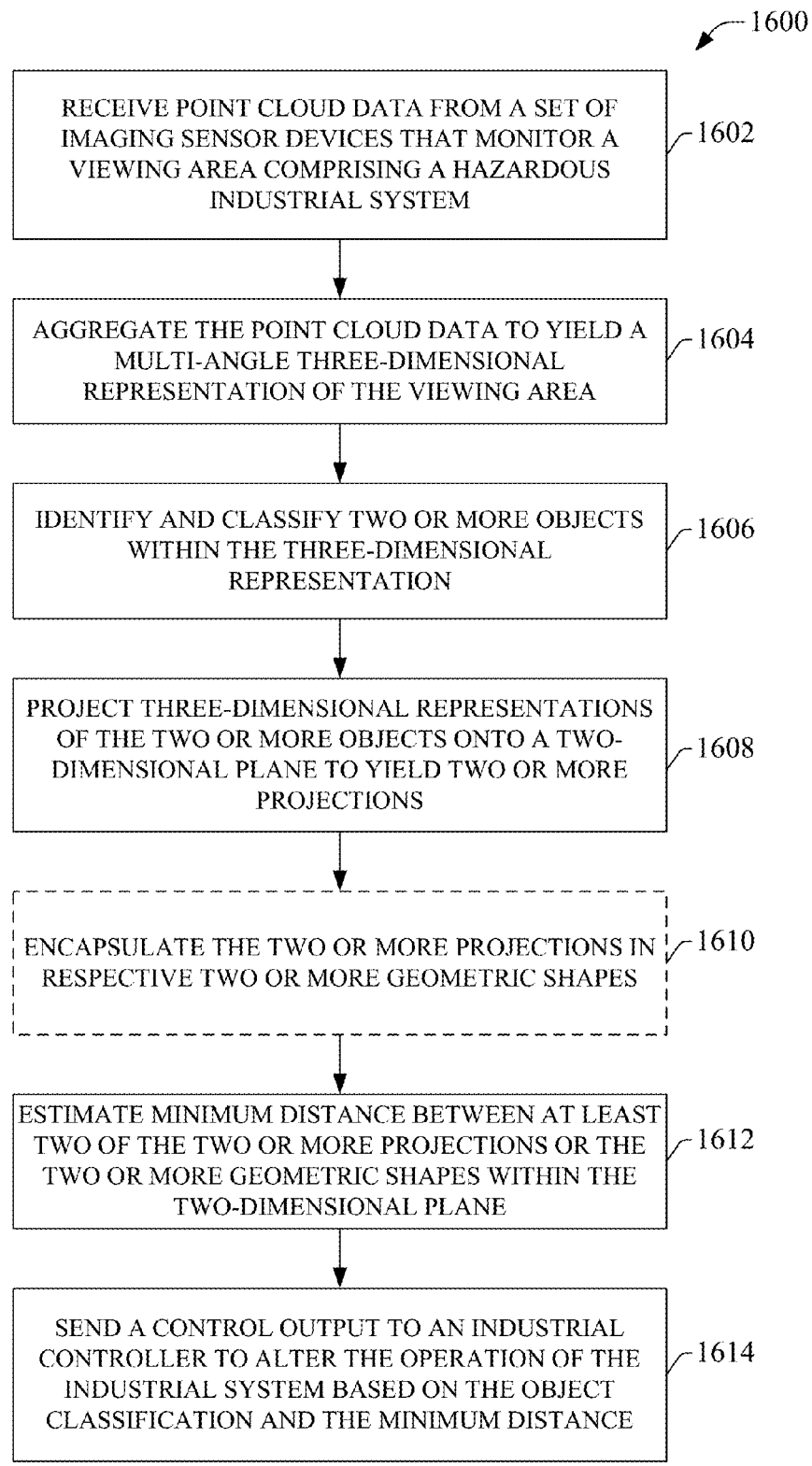
FIG. 16 is a flowchart of an example methodology for estimating a minimum distance between two objects based on analysis of point cloud data generated by multiple imaging sensor devices.

FIGS. 14-16 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 14 illustrates an example methodology 1400 for integrating an imaging sensor device with an industrial control system to provide optical safety. Initially, at 1402, image data is received at an imaging sensor device corresponding to an image of a viewing area comprising a hazardous machine monitored by the device. The image data can be obtained by emitting light illumination into the viewing area and measuring the reflected light received by each pixel of the imaging sensor device's photo-receiver array. At 1404, pixel array information is generated by the imaging sensor device based on the image data received at step 1402. The pixel array information can collectively comprise pixel data for an image frame collected by the imaging sensor device. At 1406, two-dimensional (2D) analysis is performed on a first subset of the pixel array to at least one of identify an object within the image, classify an object within the image, or correlate two or more objects identified in the image.

At 1408, three-dimensional (3D) analysis is performed on a second subset of the pixel array to determine distance information for spaces within the viewing area corresponding to the second subset of the pixel array. In some embodiments, the second subset of the pixel array on which 3D analysis is to be performed can be defined by a system designer prior to operation and recorded in a configuration profile, which can be read by a pixel array component of the imaging sensor device in order to group the first and second subsets of the pixel array for respective 2D and 3D analysis. Alternatively, the imaging sensor device can dynamically select the second subset of the pixel array for 3D analysis based on results of the 2D analysis performed at step 1406. For example, if the 2D analysis determines that an object of a certain classification has entered the viewing field, the imaging sensor device may define an area of the pixel array corresponding to the newly identified object and begin performing 3D analysis on the object in order to obtain spatial information for the object.

At 1410, a control output is generated by the imaging sensor device based on correlation of information generated by the 2D analysis and the 3D analysis and sent to an industrial controller associated with the industrial system. For example, the imaging sensor device may correlate the 2D and 3D analysis results to yield an identity position, speed, acceleration, orientation, and/or trajectory for the object and generate the control output based on one or more of these measured factors. The control output may comprise, for example, an instruction to an industrial controller to transition the industrial system to a safe mode, to disable the industrial system, to alter the current operating cycle of the industrial system, or other such instructions.

FIG. 15 illustrates an example methodology 1500 for dynamically selecting a portion of a pixel array for selective 3D analysis in an industrial safety system that utilizes optical area monitoring. Initially, at 1502, image data is received at an imaging sensor device corresponding to an image of a viewing area comprising a hazardous industrial system monitored by the device. At 1504, pixel array information is generated by the imaging sensor device based on the image data received at step 1502. At 1506, 2D imaging analysis is performed on the pixel array. At 1508, an object within the image is identified and classified based on the 2D imaging analysis.

At 1510, a determination is made regarding whether the classification of the object determined at step 1508 requires 3D (distance) analysis. For example, the sensor device may be trained to identify when a human has entered the viewing area. Accordingly, the sensor can determine that an object having a "human" classification has entered the viewing area based on the 2D analysis and object classification performed at steps 1506 and 1508.

If the object classification does not require 3D analysis, the methodology returns to step 1502 and continues monitoring received image data. Alternatively, if the object classification is determined to require 3D analysis, the methodology moves to step 1512, where a subset of the pixel array corresponding to an area of the image surrounding the object is identified. At 1514, 3D analysis is performed on the subset of the pixel array identified at step 1512 in order to determine distance information for the object. At 1516, a control output is generated by the imaging sensor device based on correlation of information generated by the 2D analysis of step 1506 and the 3D analysis of step 1514, and the control output is sent to an industrial controller associated with the industrial system. This may include, for example, identifying a potentially hazardous condition or risk based on correlation of the 2D and 3D results and sending an instruction to the industrial controller (which is communicatively connected to the imaging sensor) to perform an action designed to mitigate the detected hazard. The action may comprise, for example, switching an industrial machine or system to a safe state (e.g., stopping the machine, switching the machine to a slow operation mode, returning the machine to the home position, etc.) or other such action.

FIG. 16 illustrates an example methodology 1600 for estimating a minimum distance between two objects based on analysis of point cloud data generated by multiple imaging sensor devices. Initially, at 1602, point cloud data is received from a set of imaging sensor devices that monitor a viewing area comprising a hazardous industrial system. The imaging sensor devices may be mounted around and trained on the hazardous area to collect image data for the area from different viewing angles. Point cloud data from a given one of the imaging sensor devices comprises distance information calculated for respective pixels of a pixel array using time-of-flight measurement, phase offset measurement, or other optical distance measuring techniques. In some scenarios, different types of sensors—in addition to 2D and 3D image sensors—may be used to facilitate classification of objects within the viewing area, including but not limited to passive infrared sensors, tagging objects, sensors that generate localization data, etc. At 1604, the point cloud data is aggregated to yield a multi-angle three-dimensional representation of the viewing area. In some configurations, the aggregation can be performed by a safety controller that receives the point cloud data from the set of imaging sensor devices. In another example, one of the imaging sensor devices can be configured as a master device that collects point cloud data from the other sensors and performs centralized processing of the aggregated data.

At 1606, two or more objects within the three-dimensional representation generated at step 1604 are identified and classified based on analysis of the aggregated point cloud data. For example, an analysis component may be configured to recognize objects corresponding to human operators, hazardous machines, trolleys, or other predefined object classifications. In some configurations, information from other sensing technologies may also be used in conjunction with the point cloud data in order to accurately classify the two or more objects (e.g., passive infrared sensing, localization, tagging objects, etc.). At 1608, three-dimensional representations of the identified images are projected onto a two-dimensional plane to yield one or more projections. At 1610, as an optional step, the two or more projections are encapsulated in respective two or more known geometric shapes.

At 1612, a minimum distance is estimated between at least two of the two or more projections (or the two or more geometric shapes if optional step 1610 is implemented). At 1614, a control output is sent to an industrial controller to alter the operation of an industrial system based on the object classification determined at step 1606 and the minimum distance determined at step 1612.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 17:
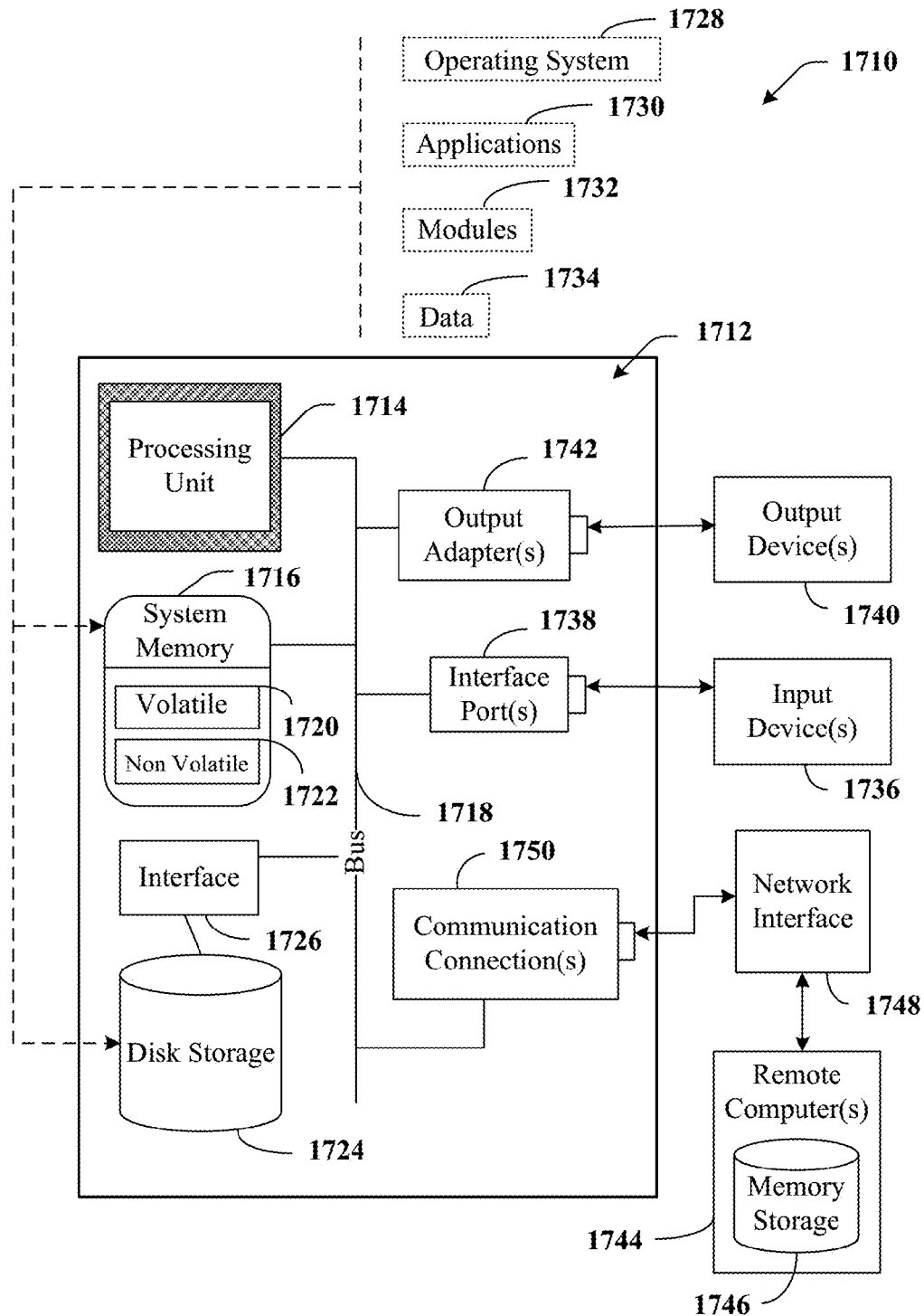
FIG. 17 is an example computing environment.
Figure 18:
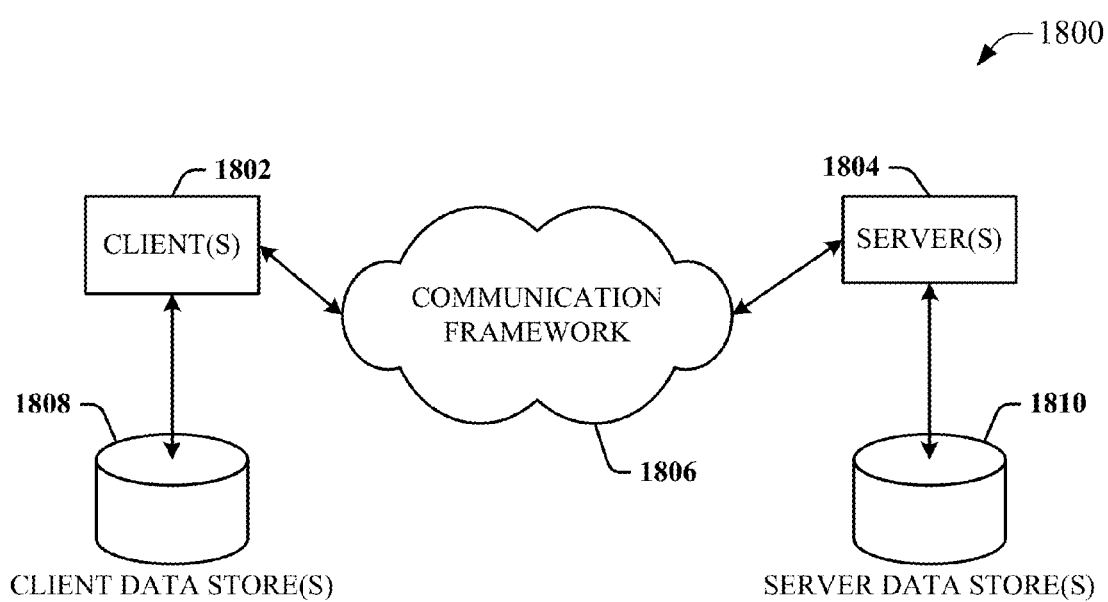
FIG. 18 is an example networking environment.

In order to provide a context for the various aspects of the disclosed subject matter, FIGS. 17 and 18 as well as the following discussion are intended to provide a brief, general description of a suitable environment in which the various aspects of the disclosed subject matter may be implemented. With reference to FIG. 17, an example environment 1710 for implementing various aspects of the aforementioned subject matter includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Multi-core microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable PROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/non-removable, volatile/nonvolatile computer storage media. FIG. 17 illustrates, for example a disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer 1712. System applications 1730 take advantage of the management of resources by operating system 1728 through program modules 1732 and program data 1734 stored either in system memory 1716 or on disk storage 1724. It is to be appreciated that one or more embodiments of the subject disclosure can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712, and to output information from computer 1712 to an output device 1740. Output adapters 1742 are provided to illustrate that there are some output devices 1740 like monitors, speakers, and printers, among other output devices 1740, which require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the system bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

FIG. 18 is a schematic block diagram of a sample computing environment 1800 with which the disclosed subject matter can interact. The sample computing environment 1800 includes one or more client(s) 1802. The client(s) 1802 can be hardware and/or software (e.g., threads, processes, computing devices). The sample computing environment 1800 also includes one or more server(s) 1804. The server(s) 1804 can also be hardware and/or software (e.g., threads, processes, computing devices). The servers 1804 can house threads to perform transformations by employing one or more embodiments as described herein, for example. One possible communication between a client 1802 and servers 1804 can be in the form of a data packet adapted to be transmitted between two or more computer processes. The sample computing environment 1800 includes a communication framework 1806 that can be employed to facilitate communications between the client(s) 1802 and the server(s) 1804. The client(s) 1802 are operably connected to one or more client data store(s) 1808 that can be employed to store information local to the client(s) 1802. Similarly, the server (s) 1804 are operably connected to one or more server data store(s) 1810 that can be employed to store information local to the servers 1804.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An optical safety system, comprising:
   a memory that stores executable instructions; and
   a processor, communicatively coupled to the memory, that executes or facilitates execution of the executable instructions to at least:
   capture image data representing an industrial area;
   classify a first object represented in the image data as industrial equipment and a second object represented in the image data as a human based on a first result of a first type of analysis performed on a first subset of pixels of the image data and a second result of a second type of analysis performed on a second subset of the pixels;
   correlate the first result and the second result to yield correlated information relating to a relationship between the human and the industrial equipment; and
   control an output signal that controls the industrial equipment based on the correlated information.

2. The optical safety system of claim 1, wherein the first type of analysis comprises a two-dimensional (2D) analysis and the second type of analysis comprises a three-dimensional (3D) analysis.

3. The optical safety system of claim 2, wherein the processor further executes or facilitates execution of the executable instructions to at least, for one or more pixel arrays of the image data, group pixels of the one or more pixel arrays to yield the second subset of the pixels.

4. The optical safety system of claim 3, wherein the processor further executes or facilitates execution of the executable instructions to at least identify the second subset of the pixels based on a configuration profile that defines one or more portions of the one or more pixel arrays on which the 3D analysis is to be performed, and wherein the second subset of the pixels comprises one of a single contiguous group of pixels or multiple non-contiguous groups of pixels.

5. The optical safety system of claim 3, wherein the processor further executes or facilitates execution of the executable instructions to at least select the second subset of the pixels based on classifications of the first object and the second object and locations of the first object and the second object determined based on the 2D analysis, and wherein the second subset of the pixels comprises one of a single contiguous group of pixels or multiple non-contiguous groups of pixels.

6. The optical safety system of claim 3, wherein the processor further executes or facilitates execution of the executable instructions to at least:
   generate three-dimensional image information for the industrial area based on aggregation of pixel-level distance information collected by one or more imaging sensor devices for the second subset of the pixels; and
   perform the 3D analysis on the three-dimensional image information.

7. The optical safety system of claim 2, wherein the 2D analysis comprises at least one of object recognition, object classification, determination of an x-y location of at least one of the first object or the second object, correlation of pixel groups within the image data determined to belong to a common object, human recognition, or facial recognition.

8. The optical safety system of claim 2, wherein the correlated information comprises at least one of a three-dimensional location of the second object relative to the first object, a three-dimensional velocity of the second object relative to the first object, a three-dimensional acceleration of the second object relative to the first object, or a three-dimensional trajectory of the second object relative to the first object.

9. The optical safety system of claim 6, wherein the processor further executes or facilitates execution of the executable instructions to at least:
   estimate the first object and the second object as respective three-dimensional geometric objects within a three-dimensional space represented by the three-dimensional image data, wherein the geometric objects respectively encapsulate the first object and the second object,
   determine a minimum distance between the geometric objects to yield an estimated distance between the first object and the second object; and
   control the output signal based at least in part on the minimum distance.

10. A method for controlling industrial equipment, comprising:
    recording, by a safety system comprising at least one processor, image data representing an industrial area;
    classifying, by the safety system, a first object recorded in the image data as an industrial machine and a second object recorded in the image data as a human based on a first result of a first type of analysis performed on a first subset of pixels of the image data and a second result of a second type of analysis performed on a second subset of the pixels;
    correlating, by the safety system, the first result and the second result to yield correlated information defining a relationship between the human and the industrial machine; and
    controlling, by the safety system, an output signal that controls the industrial machine based on the correlated information.

11. The method of claim 10, further comprising:
    performing, as the first type of analysis, a two-dimensional (2D) analysis on the first subset of the pixels; and
    performing, as the second type of analysis, a three-dimensional (3D) analysis on the second subset of the pixels.

12. The method of claim 10, wherein the controlling comprises at least one of initiating a removal of power from the industrial machine or initiating a change of an operating mode of the industrial machine.

13. The method of claim 10, further comprising, for one or more pixel arrays of the image data, grouping pixels of the one or more pixel arrays to yield the second subset of the pixels.

14. The method of claim 11, further comprising identifying, by the safety system, the second subset of the pixels based on configuration profile data that defines one or more portions of the one or more pixel arrays on which the 3D analysis is to be performed, wherein the second subset of the pixels comprises one of a single contiguous group of pixels or multiple non-contiguous groups of pixels.

15. The method of claim 11, further comprising:
determining, by the safety system, respective locations of the first object and the second object based on the first result of the 2D analysis; and
selecting, by the safety system, the second subset of the pixels based on the classifying and locations.

16. The method of claim 11, further comprising:
generating, by the safety system, three-dimensional image information for the industrial area based on aggregation of pixel-level distance information collected by one or more imaging sensor devices for the second subset of the pixels; and
performing, by the safety system, the 3D analysis on the three-dimensional image information.

17. The method of claim 11, further comprising performing, by the safety system as the 2D analysis, at least one of object recognition, object classification, determination of an x-y location of at least one of the first object or the second object, correlation of pixel groups within the image data determined to belong to a common object, human recognition, or facial recognition.

18. The method of claim 11, wherein the correlating comprises determining, as the correlated information, at least one of a three-dimensional location of the second object relative to the first object, a three-dimensional velocity of the second object relative to the first object, a three-dimensional acceleration of the second object relative to the first object, or a three-dimensional trajectory for the second object relative to the first object.

19. A non-transitory computer-readable medium having stored thereon instructions that, in response to execution, cause a system comprising a processor to perform operations, the operations comprising:
collecting image data representing an industrial area;
classifying a first object recorded in the image data as industrial equipment and a second object recorded in the image data as a human based on a first result of a first type of analysis performed on a first subset of pixels of the image data and a second result of a second type of analysis performed on a second subset of the pixels;
generate correlated information based on one or more correlations between the first result and the second result, the correlated information defining a relationship between the human and the industrial equipment; and
controlling an output signal that controls the industrial equipment based on the correlated information.

20. The non-transitory computer-readable medium of claim 19, the operations further comprising:
performing, as the first type of analysis, a two-dimensional analysis; and
performing, as the second type of analysis, a three-dimensional analysis.

* * * * *